US006331853B1

(12) United States Patent
Miyashita

(10) Patent No.: US 6,331,853 B1
(45) Date of Patent: Dec. 18, 2001

(54) DISPLAY CONTROL APPARATUS DISPLAY CONTROL METHOD AND PRESENTATION MEDIUM

(75) Inventor: Ken Miyashita, Tokyo (JP)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 09/199,243

(22) Filed: Nov. 24, 1998

(30) Foreign Application Priority Data

Nov. 28, 1997 (JP) .................................................. 9-327835

(51) Int. Cl.[7] .................................................. G06F 15/00
(52) U.S. Cl. .................................................. 345/427
(58) Field of Search .................................. 345/473, 419, 345/422, 426, 427, 474, 475

(56) References Cited

U.S. PATENT DOCUMENTS 5,917,495 * 6/1999 Doi et al. ............................... 345/474
6,072,478 * 6/2000 Kurihara et al. ...................... 345/473

* cited by examiner

Primary Examiner—Phu K. Nguyen
(74) Attorney, Agent, or Firm—Oblon, Spivak, McClelland, Maier & Neustadt, P.C.

(57) ABSTRACT

A browser presents a picture of a 3-dimensional virtual space photographed by means of a hypothetical camera used for photographing a 3-dimensional virtual space. The browser is provided with a switch button for switching from a first-person mode in which the visual point of a pilot avatar representing the user itself in the 3-dimensional virtual space coincides with the position of the camera to a third-person mode with the visual point of the pilot avatar not coinciding with the position of the camera and vice versa. In the third-person mode, the position of the camera is controlled in accordance with the visual point of the pilot avatar.

As a result, the user is capable of feeling a sense as if the user were present in a virtual world and feeling a sense as if the user had departed from the body thereof as a soul.

12 Claims, 20 Drawing Sheets

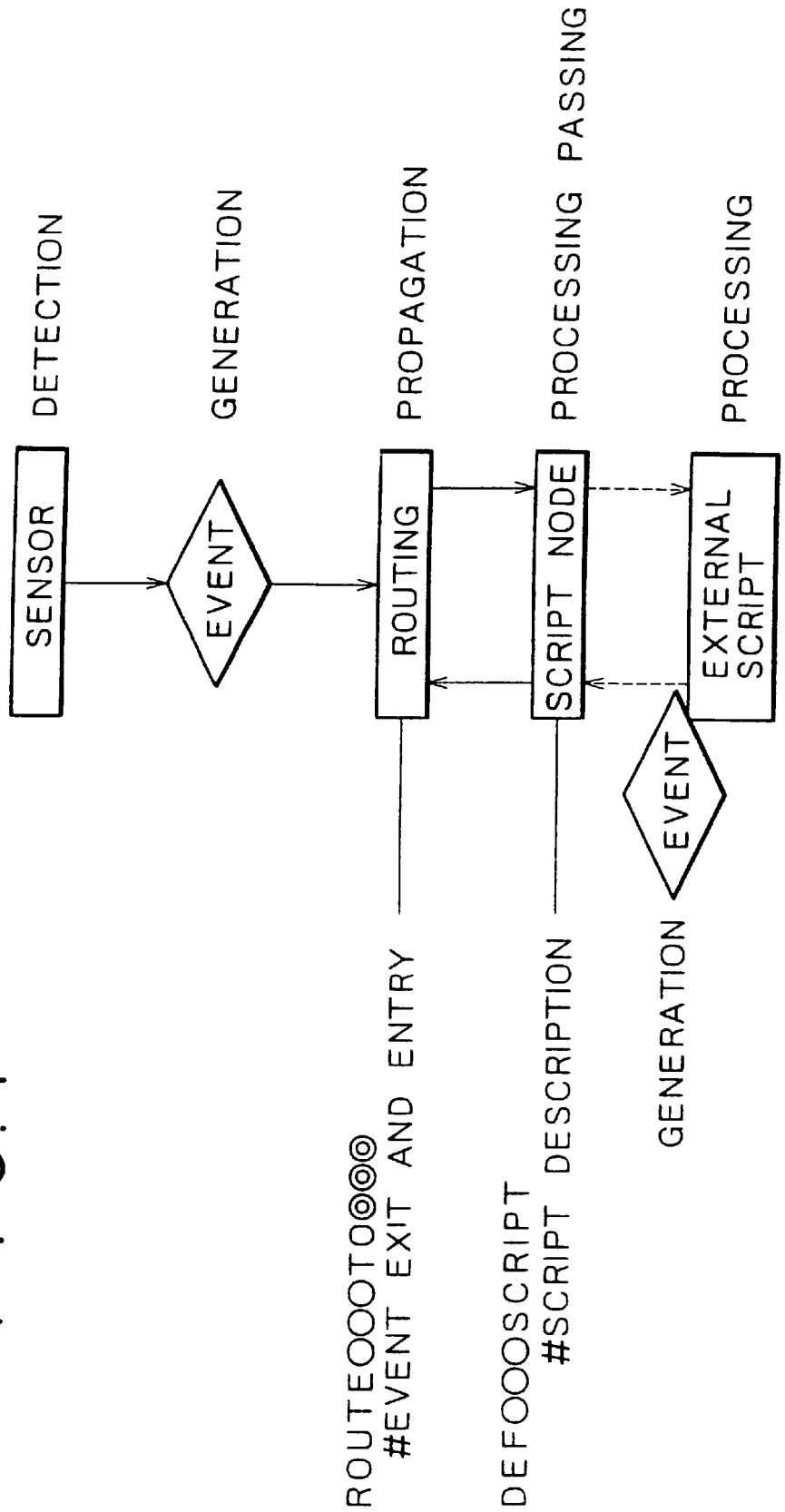
F I G. 1

FIG. 2

ROUTE Node Name.event Out Name TO Node Name.event In Name (ROUTE DECLARATION)
(THE NAME OF A NODE)
(THE NAME OF AN OUTGOING EVENT)
(THE NAME OF A NODE)
(THE NAME OF AN INCOMING EVENT)

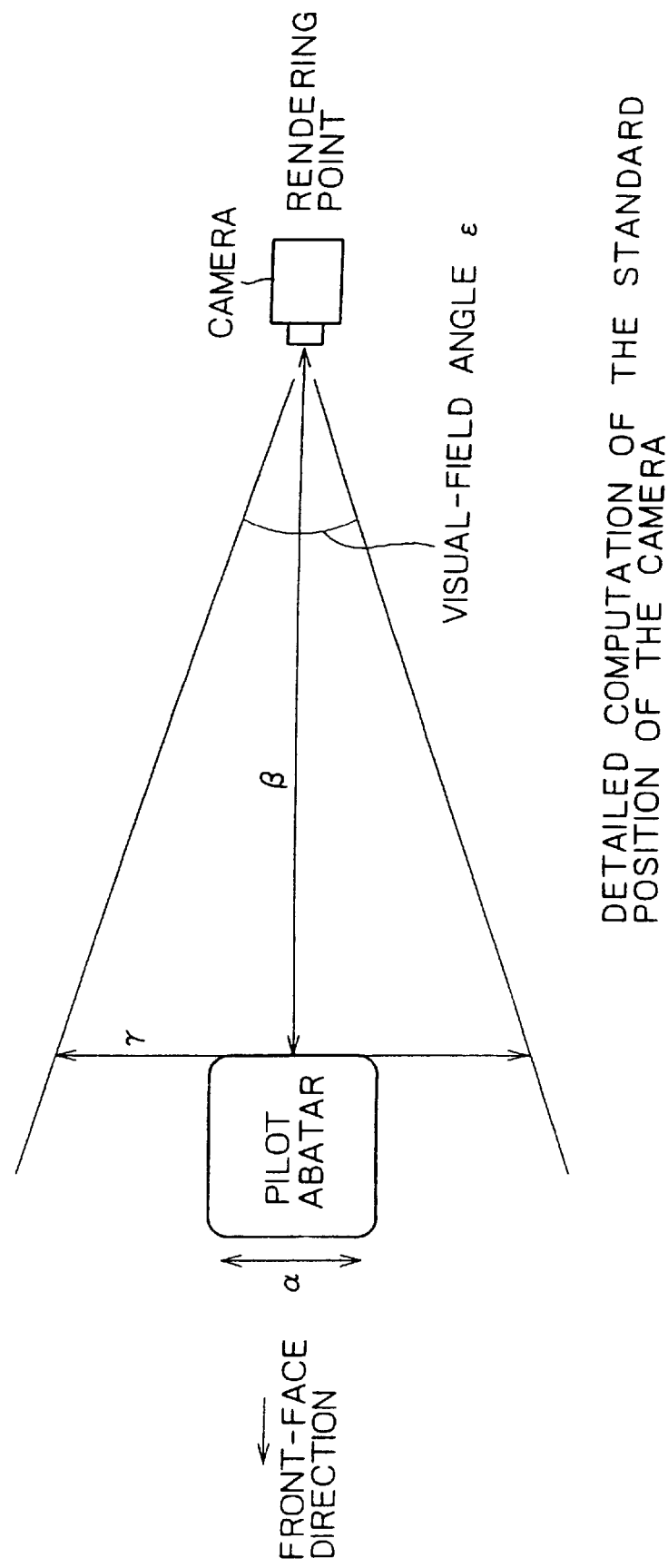

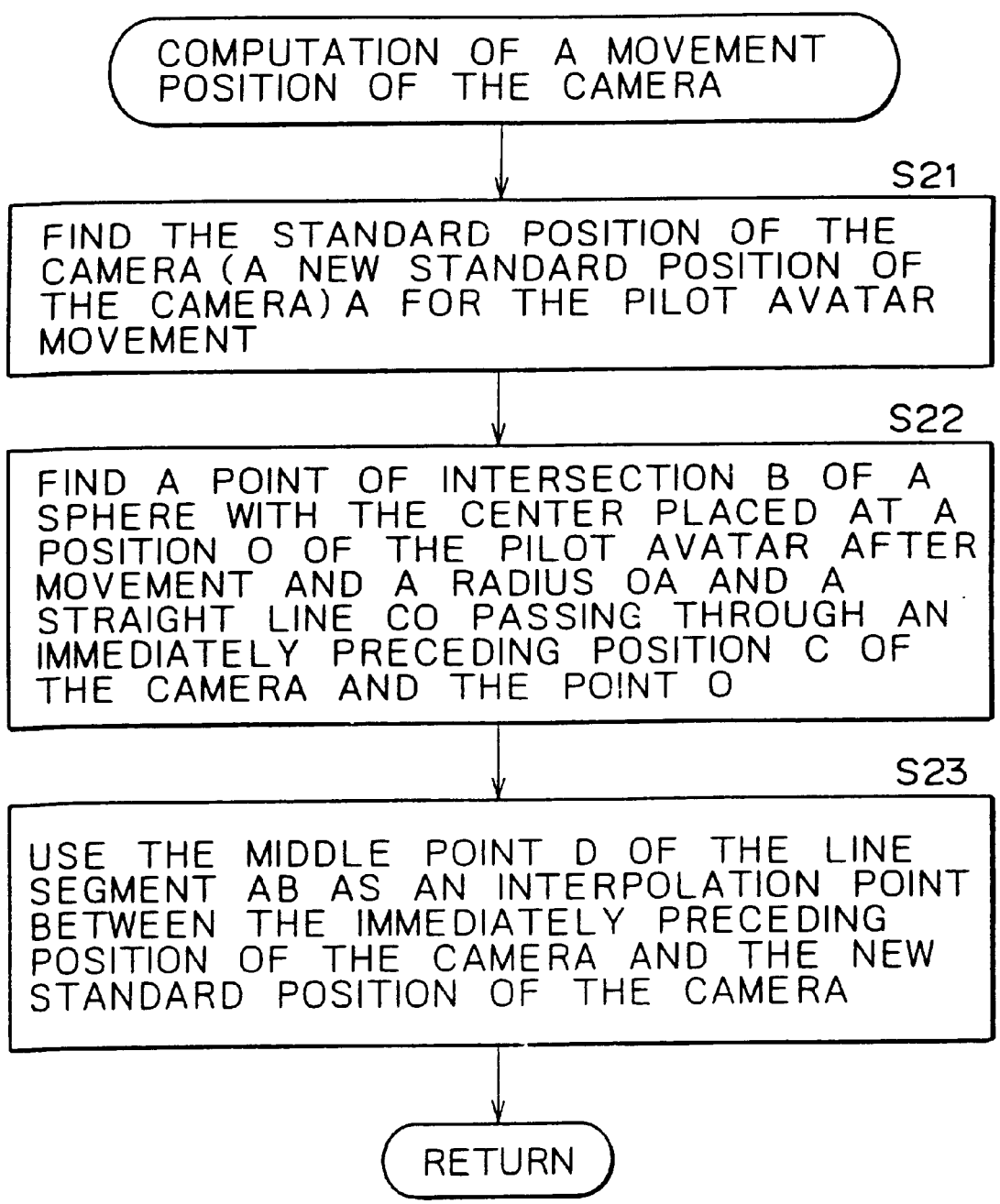

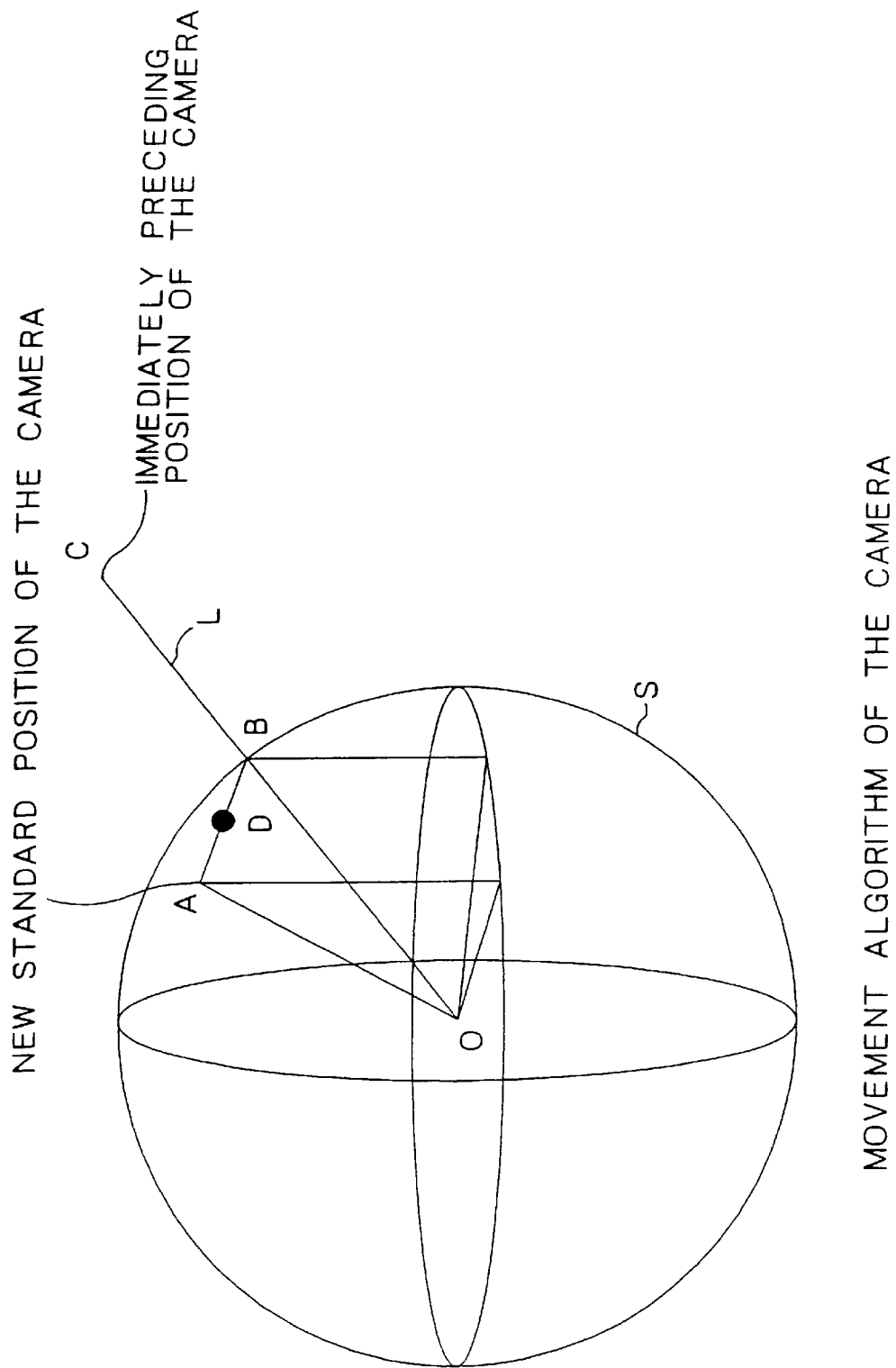

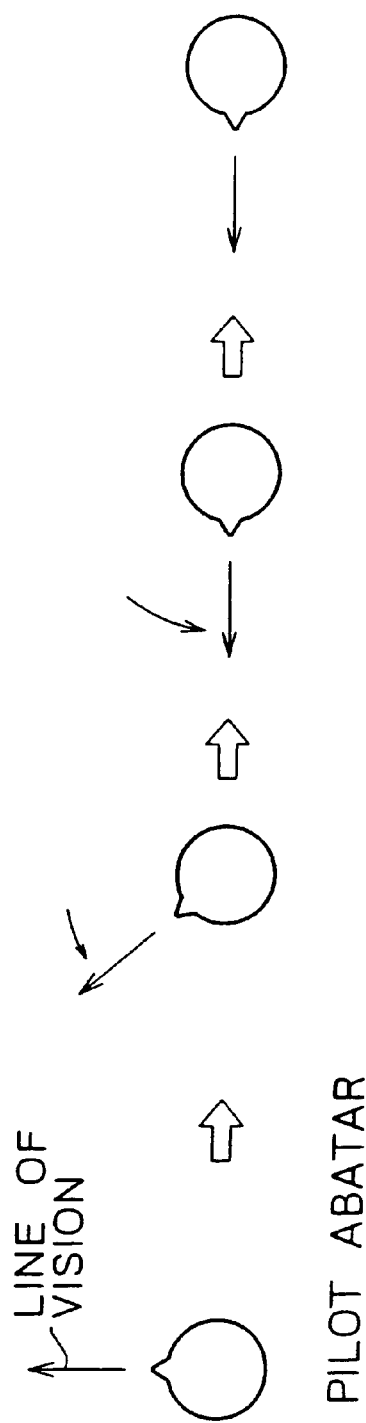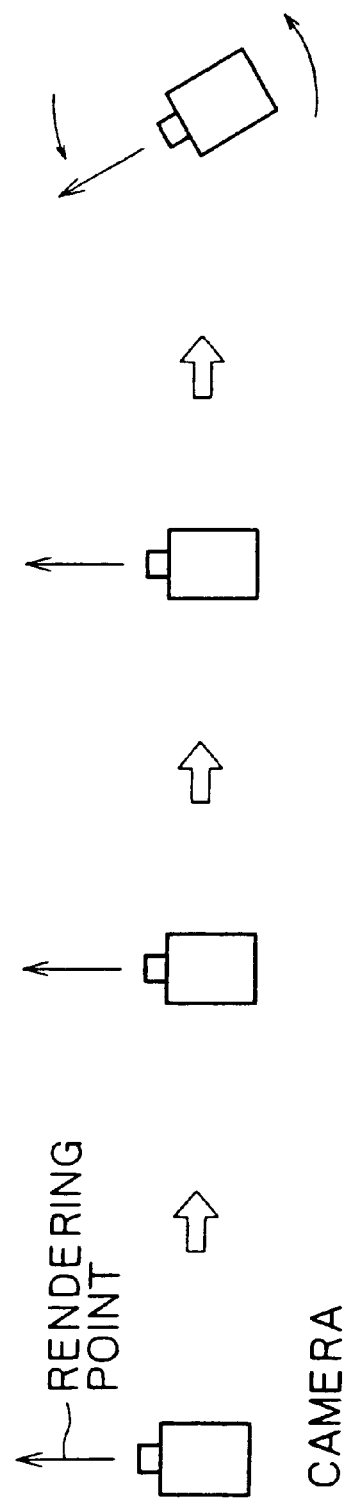

DISPLAY CONTROL APPARATUS DISPLAY CONTROL METHOD AND PRESENTATION MEDIUM

BACKGROUND OF THE INVENTION

In general, the present invention relates to a display control apparatus, a display control method and a presentation medium. More particularly, the present invention relates to a display control apparatus, a display control method and a presentation medium which are capable of changing the point of sight of a user to a proper position dynamically in an operation to display a 3-dimensional virtual space.

In the field of so-called personal-computer communication services wherein a plurality of users each connect its own personal computer to a central host computer through a modem provided for the personal computer and a public telephone line network to make an access to the host computer in accordance with a predetermined communication protocol as is the case with NIFTY-Serve (a trademark) of Japan and CompuServe (a trademark) of the US, a cyberspace service known as Habitat (a trademark) is known.

The development of Habitat was started in the year of 1985 by a US company named LucasFilm. After Habitat was operated by QuantumLink, a US company rendering services through commercial networks, for about 3 years, Fujitsu Habitat (a trademark) was started in February 1990 to render services of NIFTY-Serve. In Habitat, a place and status of each user, that is, an object representing the status and place of the user, are sent to a virtual city called a populopolis, a 2-dimensional graphical drawing, allowing the users to have chats among them. The object is referred to as an avatar which means an incarnation of an Indian deity told in an Indian myth. In actuality, a Habitat chat is a real-time conversation based on texts entered and displayed in terms of characters. For more detailed explanation of Habitat, refer to a reference with a title of "Cyberspace" authored by Michael Benedikt, an NTT publication ISBN4-87188-265-9C0010 with a first edition published on Mar. 20, 1994 or "Cyberspace: First Steps" authored by Michael Benedikt, a 1991 edition, published by MIT Press Cambridge, Mass. ISBN0-262-02327-X, pages 282 to 307.

In a conventional cyberspace system implemented by personal-computer communication services of this type, a scene of a row of virtual houses on a virtual street and the interior of a virtual room are drawn as 2-dimensional graphics. The avatar is merely moved up and down on a background of a 2-dimensional graphic in order to move to an inner or outer position with respect to the viewer in a virtual space. Thus, to realize a pseudo experience of a walk or a behavior in a virtual space, the power of expression on the display of the virtual space is considered to be weak. In addition, a virtual space in which the avatar representing the status and the place of the user itself and the avatar of a partner are displayed is seen at a point of vision of a third party. Also at this point, a sense of a pseudo experience is lost.

In order to solve this problem, a virtual space is displayed as a 3-dimensional graphic as is disclosed in Japanese Patent Laid-open No. Hei9-81781. In this solution to the problem, a function allowing the user to walk through the point of vision of an avatar is implemented by utilizing a VRML (Virtual Reality Modeling Language), a descriptive language for describing 3-dimensional graphical data. A consideration of a variety of cyberspaces, which are used for letting avatars each representing a user have chats, is described in Nikkei Electronics, Sep. 9, 1996, No. 670, pages 151 to 159.

When walking through a 3-dimensional virtual space, that is, a virtual space displayed as a 3-dimensional graphic as described above, at the point of vision of an avatar, the user is capable of feeling a sense as if the user were indeed present in the 3-dimensional virtual space.

In a 3-dimensional virtual space, by the way, an event that exists in reality and, of course, a hypothetical event fancied by a human being can be implemented. A hypothetical event fancied by a human being is, for example, a state in which the soul of the human being departs from the body, becoming another human being observing a fanciful world wherein the other human being itself exists. To put it concretely, assume for example that the point of vision of the user is made a point of vision at which an avatar representing the user itself is visible. An avatar representing the user itself is appropriately referred to hereafter as a pilot avatar. At such a point of vision, the user is capable of seeing the pilot avatar which represents the user itself. In this case, the user turning into a soul observes the pilot avatar representing the user itself who really exists. That is to say, the user is capable of feeling a sense as if the user had departed from its own body as a soul.

By merely making the point of vision of the user an arbitrary point of vision at which the pilot avatar is visible, that is, by merely presenting a picture of a 3-dimensional space including the pilot avatar, however, the sense of a pseudo experience may be lost in some cases.

If the direct front of the face of the pilot avatar is used as a point of vision of the user for example, the closed-up face of the pilot avatar is displayed so that it is difficult for the user to feel a sense as if the user turning into a soul were observing the user itself who really exists.

With an arbitrary point of vision, at which the pilot avatar is visible, used as a point of vision of the user as it is, it is possible to provide a sense felt as if the user had departed from the body as a soul. In this case, however, a virtual space in which the pilot avatar and the avatar of a partner are displayed is seen at a point of vision of a third party. It is thus difficult for the user to feel a sense as if the user itself were present in a virtual world, that is, to feel a sense as if the user itself were present in a virtual world, walking about through the virtual world. It should be noted that the avatar of a partner is appropriately referred to hereafter as a drawn avatar.

For this reason, convenience will be obtained if it is possible to switch from a state of making the point of vision of the user coincident with the point of vision of the pilot avatar to a state of not making the point of vision of the user coincident with the point of vision of the pilot avatar and vice versa.

In the case of a state in which the point of vision of the user is not made coincident with the point of vision of the pilot avatar, it is desirable to place the point of vision of the user at a point at which the user is capable of feeling a sense as if the user turning into a soul were observing the user itself who really exists. To put it concretely, if the user is capable of seeing scenery being seen by the pilot avatar representing the user itself along with the pilot avatar, the user is expected to be capable of feeling a sense as if the user turning into a soul were observing the user itself who really exists. It is desirable to present such a picture right after establishing a state in which the point of vision of the user is made not coincident with the point of vision of the pilot avatar.

SUMMARY OR THE INVENTION

It is an object of the present invention addressing the problems described above to provide a capability of changing the point of vision of the user dynamically to a proper point so as to provide the user with typically a sense felt as if the user itself were present in a virtual world or a sense felt as if the user had departed from its body as a soul as the user desires.

According to a first aspect of the present invention, there is provided a display control apparatus for controlling an operation to display a 3-dimensional virtual space, the apparatus comprising:

presentation means for presenting a picture of a 3-dimensional virtual space photographed by using a hypothetical photographing means used for photographing a 3-dimensional virtual space;

a mode switching means for switching from a first-person mode in which a visual point of a self representing object representing the user itself in mode 3-dimensional virtual space coincides with the position of the photographing means to a third-person mode with the visual point of the self representing object not coinciding with the position of the photographing means and vice versa; and a control means for controlling the position of the photographing means in accordance with the visual point of the self representing object in the third-person mode.

According to a second aspect of the present invention, there is provided a display control method for controlling an operation to display a 3-dimensional virtual space whereby:

in an operation to present a picture of a 3-dimensional virtual space photographed by using a hypothetical photographing means used for photographing a 3-dimensional virtual space, it is possible to switch from a first-person mode in which a visual point of a self representing object representing the user itself in a 3-dimensional virtual space coincides with the position of the photographing means to a third-person mode with the visual point of the self representing object not coinciding with the position of the photographing means and vice versa; and in the third-person mode, the position of the photographing means is controlled in accordance with the visual point of the self representing object.

According to a third aspect of the present invention, there is provided a presentation medium for presenting a computer program to be executed by a computer in order to carry out processing of controlling an operation to display a 3-dimensional virtual space, the computer program prescribing a display control method whereby:

in an operation to present a picture of a 3-dimensional virtual space photographed by using a hypothetical photographing means used for photographing a 3-dimensional virtual space, it is possible to switch from a first-person mode in which a visual point of a self representing object representing the user itself in a 3-dimensional virtual space coincides with the position of the photographing means to a third-person mode with the visual point of the self representing object not coinciding with the position of the photographing means and vice versa; and in the third-person mode, the position of the photographing means is controlled in accordance with the visual point of the self representing object.

In a display control apparatus according to the first aspect of the present invention, presentation means is used for presenting a picture of a 3-dimensional virtual space photographed by using a hypothetical photographing means used for photographing a 3-dimensional virtual space;

a mode switching means is used for switching from a first-person mode in which a visual point of a self representing object representing the user itself in a 3-dimensional virtual space coincides with the position of the photographing means to a third-person mode with the visual point of the self representing object not coinciding with the position of the photographing means and vice versa; and control means is used for controlling the position of the photographing means in accordance with the visual point of the self representing object in the third-person mode.

With a display control method according to the second aspect of the present invention, in an operation to present a picture of a 3-dimensional virtual space photographed by using a hypothetical photographing means used for photographing a 3-dimensional virtual space, it is possible to switch from a first-person mode in which a visual point of a self representing object representing the user itself in a 3-dimensional virtual space coincides with the position of the photographing means to a third-person mode with the visual point of the self representing object not coinciding with the position of the photographing means and vice versa; and in the third-person mode, the position of the photographing means is controlled in accordance with the visual point of the self representing object.

A presentation medium according to the third aspect of the present invention presents a computer program to be executed by a computer in order to carry out processing in accordance with a display control method whereby:

in an operation to present a picture of a 3-dimensional virtual space photographed by using a hypothetical photographing means used for photographing a 3-dimensional virtual space, it is possible to switch from a first-person mode in which a visual point of a self representing object representing the user itself in a 3-dimensional virtual space coincides with the position of the photographing means to a third-person mode with the visual point of the self representing object not coinciding with the position of the photographing means and vice versa; and in the third-person mode, the position of the photographing means is controlled in accordance with the visual point of the self representing object.

BRIEF DESCRIPTION OF THE DRAWINGS

FIG. 1 is an explanatory diagram used for describing relations among a sensor, an event, a routing and a script;

FIG. 2 is an explanatory diagram used for describing the routing shown in FIG. 1;

FIG. 13 is another explanatory diagram used for describing a method to compute the standard position of the camera;

FIG. 14 is a flowchart used for explaining details of processing of step S6 of the flowchart shown in FIG. 10;

FIG. 15 is an explanatory diagram used for describing a method to compute a movement position of the camera;

FIGS. 17A and 17B are another diagrams each showing a relation between a behavior of a pilot avatar and a movement of the camera;

DETAILED DESCRIPTION OF THE PREFERRED EMBODIMENTS

Figure 3:
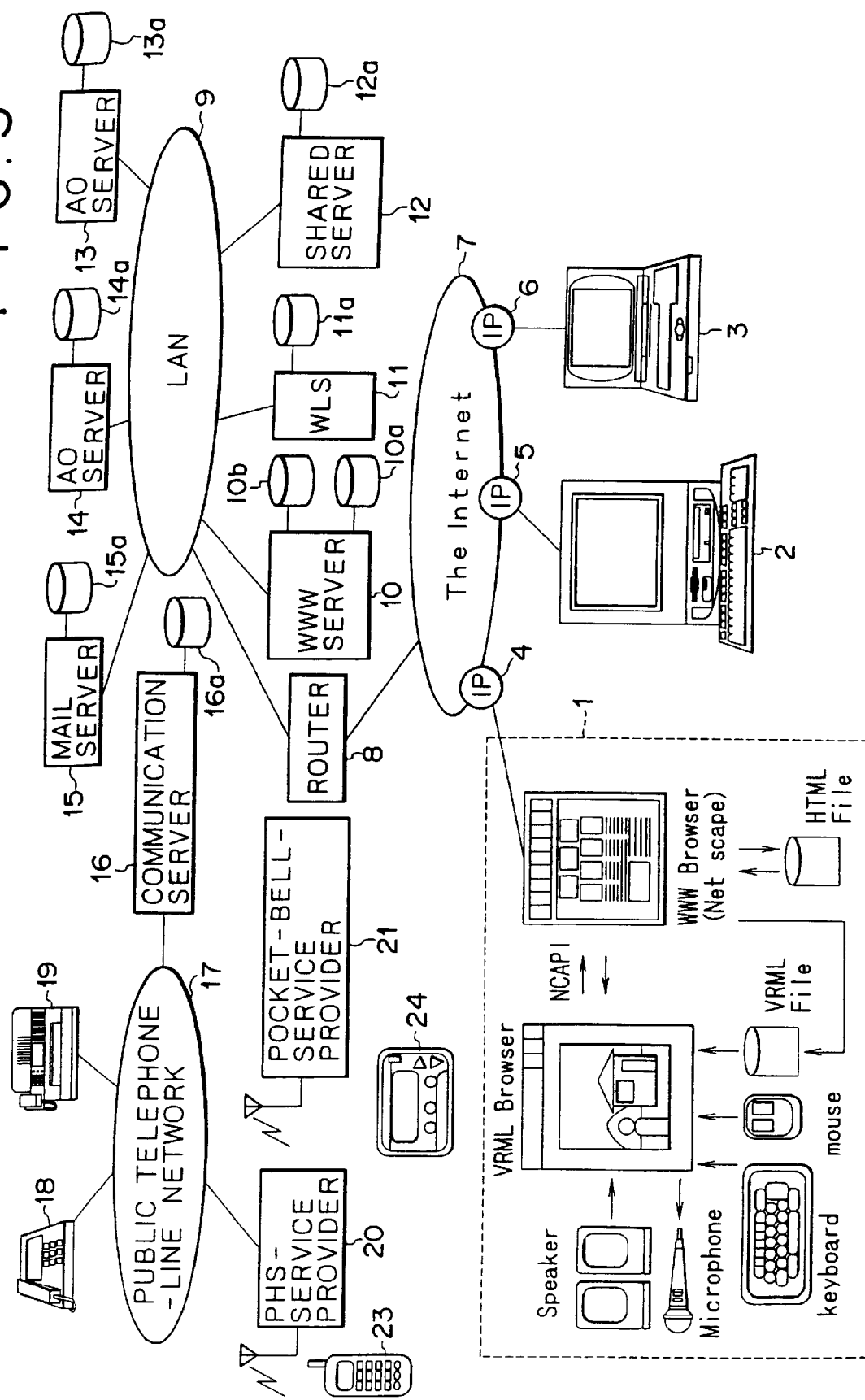
FIG. 3 is a block diagram showing a typical configuration of a shared virtual space presenting system to which the present invention is applied.

The present invention will become more apparent from a careful study of the following detailed description of some preferred embodiments with reference to the accompanying drawings.

The description of the embodiments begins with a VRML (virtual reality modeling language), a descriptive language capable of treating 3-dimensional information in a uniform manner by utilizing the construction of a WWW (world wide web) for providing various kinds of information in the Internet, a computer network constructed in a world wide scale.

As an information providing system that can be utilized in the Internet, the WWW developed by the CERN (European Center for Nuclear Research) in Switzerland is known. The WWW system allows information such as a text, picture and sound to be seen and heard in a hyper test format. In the WWW system, information stored in a WWW server is transmitted asynchronously to terminals such as personal computers in accordance with a transmission protocol called a HTTP (Hyper-Text Transfer Protocol).

The WWW server includes a HTML file for storing hyper-text information and server software called a HTTP (Hyper-Text Transfer Protocol) demon. It should be noted that the demon means a program for carrying out control and processing in the background when doing work on UNIX (a trademark). Hyper-text information is described in an HTML (Hyper-Text Markup Language). A description of a hyper-text written in the HTML comprises statements each expressed in a logical structure by format specifications each called a tag enclosed by symbols "<" and ">". A piece of hyper-text information is linked to another piece of hyper-text information by link information called an anchor. A place at which hyper-text information exists is specified by an anchor. Such a place is found by using a URL (Uniform Resource Locator).

A file for storing hyper-text information written in the HTML is transferred through a TCP/IP (Transmission Control Protocol/Internet Protocol) network in accordance with a protocol known as the HTTP. A client makes a request for hyper-text information to the WWW server which has a function to transmit the hyper-text information in response to the request.

Client software referred to as a WWW browser is widely used as an environment for using the WWW. It should be noted that the phrase "to browse" itself means to inspect or to view. A main example of the WWW browser is Netscape Navigator (a trademark of Netscape Communications, a US company).

By using a WWW browser, it is possible to view a so-called home page, that is, a file on the WWW server on the world-wide-scale Internet which serves as the URL, allowing accesses to large number of various WWW-information sources to be made by sequentially tracing home pages connected to each other by links in an operation known as a so-called network surf-in.

In recent years, this WWW is further expanded to allow a hyper-text link to be set for a description of a 3-dimensional space and an object drawn as a 3-dimensional graphic along with development of a VRML browser for displaying a 3-dimensional space written in a 3-dimensional graphic descriptive language called a VRML that allows accesses to WWW servers to be made sequentially by tracing such hyper-text links.

Details of this VRML are described in documents such as "VRML: Browsing & Building Cyberspace" authored by Mark Pesce, 1995 New Readers Publishing ISBN 1-56205 -498-8, translated by Kohichi Matsuda, Terutaka Uraji, Shoichi Takeuchi, Yasuaki Honda, Junichi Shikimoto, Sadayuki Ishikawa, Ken Miyashita and Kazuhiro Hara as a Prentice Hall publication ISBN 4-931356-37-0 with a first edition published on Mar. 25, 1996 and "Most Recent Trends in VRML and CyberPassage" authored by Kohichi Matsuda and Yasuaki Honda, the bit Magazine (issued by Kyoritsu Publishing Company), 1996, Vol. 28, No. 7, pages 29 to 36, No. 8, pages 57 to 65, No. 9, pages 29 to 36 and No. 10, pages 49 to 58.

An ISO/IEC CD-14772 official and complete specification sheet of Version 2.0 of the Virtual Reality Modeling Language of Aug. 4, 1996 is disclosed at http://webspace.sgi.com/moving-words/spec/index.html and its Japanese version is disclosed at http://www.webcity.co.jp/info/andoh/VRML/vrml2.0/spec-jp/index.html.

Sony, the applicant for the patent of the present invention, has developed a browser for version 2.0 of the VRML and its coexisting server software called a "Community Place Browser/Bureau (a trademark)" as a product. Its β version (or a prototype version) can be loaded from a home page on the Internet at an address http://vs.sony co.jp.

In order to construct a 3-dimensional virtual space by using version 2.0 of the VRML described above, first of all, a VRML file for expressing desired contents is created. Desired contents are expressed by, among other operations, model creation, sensor addition, script creation and routing. The model creation creates figure data showing the shape, the behavior and the position of a model in a virtual space by using the VRML. The sensor addition adds a switch (or a sensor) to a model in a virtual space displayed on a screen. The switch is used for typically generating an event when the switch is clicked by the user by means of a mouse with the switch positioned to point to the model. The script creation is programming of a script for implementing an event generated by clicking a switch pointing to a model. The routing is a process to associate an operation carried out on a sensor with figure data and a script, in particular, activation of a script. Figure data, a script and a common node such as a light prescribed by the VRML are referred to hereafter as a node, a generic term.

For example, information provided at http://www.ses.co.jp/SES/STAFF/kan/howto/howto1.html well explains how to write data in version 2.0 of the VRML and pieces of sample data. Some of the information is introduced as follows.

1 How to See a World Written in Version 2.0 of the VRML

A VRML browser provided for version 2.0 of the VRML is required for seeing data written in version 2.0 of the VRML as the HTML browser is required for seeing data written in the HTML format. It should be noted that data written in version 2.0 of the VRML on this page is all seen by using the Communication Place Browser developed by Sony.

In order to indicate that data stored in a file is written in the VRML, an extension of ".wrl" is appended to the name of the file to form a file name "*.wrl" where the extension "wrl" stands for the word world. In order to further indicate that data stored in the file is written in version 2.0 of the VRML, it is necessary to describe the following on the first line of the file:

VRML V2.0 utf8

2 Basic Structure of Data Written in Version 2.0 of the VRML

Data written in version 2.0 of the VRML comprises units composed of a Node and Fields expressed basically in the following form:

Node {Field (s)}

The word "Field (s)" in the form can be omitted but the word "Node" and the braces "{" and "}" must be described.

A field specifies a parameter for passing a variable to the node. If a field is omitted, the default value of the field is used. A field can be a single-value field (SF) capable of passing only one variable or a multiple-value field (MF) capable of passing a plurality of values. A name assigned to a single-value field begins with a string of characters "SF" while a name assigned to a multiple-value field begins with a string of characters 3 How to Draw a Sphere Version 2.0 of the VRML provides nodes for drawing basic figures such as a sphere, a rectangular parallelopiped shape, a cylinder and a cone. As described above, a node has fields each used for specifying parameters to be passed to the node. In the case of a Sphere node for drawing a sphere, for example, the node has a radius field for specifying a value of the radius of the sphere. In the following example, a sphere with a radius of 1 is drawn. It should be noted that the data type of the radius field is an SFFloat type meaning a single floating-point value.

Sample 1

```
1:  #VRML V2.0 utf8
2:  Transform {
3:      children [
4:          Shape {
5:              geometry Sphere { radius 1 }
6:          }
7:      ]
8:  }
```

In actuality, lines 2 and 3 as well as lines 7 and 8 can be omitted. That is to say, by writing only line 1 and lines 4 to 6, a sphere with a radius of 1 can be drawn.

A Transform node is a sort of Group node for grouping nodes. For detailed functions and fields of other nodes appearing in the following description and the Transform node, refer to Appendix 1: VRML2.0 Node List.

As described above, a node for drawing a sphere is the Sphere node, one of nodes each called a Geometry node.

It is necessary to describe a Geometry node as a geometry field of a Shape node for defining an appearance and a shape.

4 Adding a Color to a Sphere

The following example paints a sphere drawn in the same way as the previous example with a color.

Sample 2

```
1:  #VRML V2.0 utf8
2:  Transform {
3:      children [
4:          Shape {
5:              appearance Appearance {
6:                  material Material { diffuseColor 1 0 0 }
7:              }
8:              geometry Sphere { radius 1 }
9:          }
10:     ]
11: }
```

In the above example, the sphere is drawn in the red color specified by lines 5 to 7. The data type of a diffuseColor field is SFColor for expressing a set of 3 single-precision floating-point numbers representing one of the RGB colors. A Material node is written as a material field of an Appearance node which is written as an appearance field of a Shape node. The structure thus seemingly looks complicated.

5 Pasting a Texture

Not only can an object be painted with a color, but a picture file can also be pasted on an object. File formats in version 2.0 of the VRML that can be used as a texture are JPEG, GIF and PNG. In the following example, a GIF image prepared in advance is used.

Sample 3

```
1:  #VRML V2.0 utf8
2:  Transform {
3:      children [
4:          Shape {
5:              appearance Appearance {
6:                  texture ImageTexture { url "image.gif"}
7:              }
8:              geometry Box {}
9:          }
```

-continued

Sample 3

```
10:        ]
11:   }
```

A texture is pasted by line 6. On line 6, an ImageTexture node is written as a texture field of an Appearance node. It should be noted that a Box node on line 8 is a node for drawing a rectangular parallelopiped shape.
6 Changing the Position of an Object In the following example, the sphere drawn in the red color is moved to the right.

Sample 4

```
1:   #VRML V2.0 utf8
2:   Transform {
3:        translation 200
4:        children [
5:             Shape {
6:                  appearance Appearance {
7:                       material Material { diffuseColor 100 }
8:                  }
9:                  geometry Sphere { radius 1 }
10:            }
11:       ]
12:  }
```

A translation field added on line 3 moves the object with the posture thereof unchanged. The translation field is described in the following format:

translation x y z where the symbols x, y and z represent movement distances in the x-axis, y-axis and z-axis directions. On the browser, the x-axis direction is the horizontal direction with +x and −x directions indicating the direction to the right and the left respectively. The y-axis direction is the vertical direction with the +y and −y directions indicating the upward and downward directions respectively. The z-axis direction is the direction perpendicular to the display screen with the +z and −z directions indicating the directions approaching and leaving the viewer respectively. Thus a statement "translation 200" described on line 3 of the above example indicates a movement of the object to the right direction with the posture thereof unchanged by a distance of 2.
7 Addition of an Object In the following example, a green cone is added to the left of the red sphere.

Sample 5

```
1:   #VRML V2.0 utf8
2:   Transform {
3:        translation 200
4:        children [
5:             Shape {
6:                  appearance Appearance {
7:                       material Material { diffuseColor 100 }
8:                  }
9:                  geometry Sphere { radius 1 }
10:            }
11:       ]
12:  }
```

-continued

Sample 5

```
13:  Transform {
14:       translation−200
15:       children [
16:            Shape {
17:                 appearance Appearance {
18:                      material Mateial {diffuseColor 010 }
19:                 }
20:                 geometry Cylinder {}
21:            } Material
22:       ]
23:  }
```

An additional source starting with line 13 has the same structure as the source ending with line 12. In the additional source, the object is a cone instead of sphere and the color is green instead of a red. In moving to the right as specified in the source ending with line 12.
8. Drawing Using Polygons In the description of "how to write data by using version 2.0 of the VRML", examples of primitive figures are explained. In order to display a polygon 2 nodes, namely, IndexedLineSet and IndexedFaceSet, are available for expressing a line and face respectively.

Sample 6

```
1:   #VRML V2.0 utf8
2:        Transform {
3:             children [
4:                  Shape {
5:                       geometry IndexedFaceSet {
6:                            coord Coordinate {
7:                                 point [
8:                                      000,
9:                                      100,
10:                                     101,
11:                                     001,
12:                                     010,
13:                                     110,
14:                                     111,
15:                                     011
16:                                ]
17:                           }
18:                           coordIndex [
19:                                0,1,2,3,−1,
20:                                0,1,5,4,−1,
21:                                1,2,6,5,−1,
22:                                2,3,7,6,−1,
23:                                3,0,4,7,−1,
24:                                4,5,6,7,−1
25:                           ]
26:                           solid FALSE
27:                      }
28:                 }
29:            }
30:       ]
31:  }
```

In the above example, a cube is expressed by using 6 faces. In order to represent the cube by using polygons, first of all, coordinates of vertexes of the cube are determined by lines 7 to 16. Let coordinate order numbers 0, 1, 2, . . . , 7 be assigned to the coordinates on lines 8 to 15 respectively. For example, coordinate order number 2 is assigned to coordinate values 101 on line 10, that is, coordinate values 101 on line 10 are denoted by coordinate order number 2. Then, each polygon serving as a face of the cube is specified in terms of 4 vertexes at the corners of the polygon. The 6 polygons are specified on lines 18 to 25 respectively. For example, one of the polygons to serve as a face of the cube is specified on line 19 by an array of "0, 1, 2, 3, -1" representing vertexes of the polygon with coordinate order numbers 0, 1, 2 and 3.

9. Assigning a Name to a Node

DEF and USE functions are provided to allow a node already defined to be used again. Assume for example that 2 blue spheres each with a radius of 2 are drawn. The following example shows how to draw the 2 spheres by using the technique described above.

Sample 7

```
 1:  #VRML V2.0 utf8
 2:  Transform {
 3:      children [
 4:          Shape {
 5:              appearance Appearance {
 6:                  material Material { diffuseColor 001 }
 7:              }
 8:              geometry Sphere { radius 2 }
 9:          }
10:      ]
11:  }
12:  Transform {
13:      translation050
14:      children [
15:          Shape {
16:              appearance Appearance {
17:                  material Mateial {diffuseColor 001 }
18:              }
19:              geometry Sphere { radius 2 }
20:          }
21:      ]
22:  }
```

A portion starting with line 12 to draw the second sphere is the same as the portion ending with line 11 to draw the first sphere except for line 13 described to shift coordinates of the second sphere. Drawing the second sphere by writing the same definition used to draw the first sphere as shown in the above example is clearly wasteful. Instead of adoption of the drawing technique shown in the above example, the 2 spheres can be drawn as follows.

Sample 7 (Revised)

```
 1:  #VRML V2.0 utf8
 2:  Transform {
 3:      children [
 4:          DEF BlueSphere Shape {
 5:              appearance Appearance {
 6:                  material Material { diffuseColor 001}
 7:              }
 8:              geometry Sphere { radius 2 }
 9:          }
10:      ]
11:  }
12:  Transform {
13:      translation050
14:      children [
15:          USE BlueSphere
16:          }
17:      ]
18:  }
```

The following is written on line 4:

DEF BlueSphere Shape

The DEF function assigns the name BlueSphere to the Shape node {··· ···}. Thereafter, the Shape node with the same contents can be used again by merely using the USE function as follows USE BlueSphere 10 Reading in a WRL File Creating a large amount of VRML data by describing all the data on a file is not a very good technique. Rather, dividing such a large amount of data into portions and calling a portion only when necessary provide convenience. In the latter case, an Inline node is used. Assume that sample 1 is stored in file named Sample1.wrl. In this case, sample 1 can be called by reading in the file Sample.wrl as follows.

Sample 8

```
1:  #VRML V2.0 utf8
2:  Inline {
3:      url [
4:          sample.wrl
5:      ]
6:  }
```

11 Stretching Links

If an object with a link stretched thereto is clicked, control can jump to another page.

Sample 9

```
 1:  #VRML V2.0 utf8
 2:  Anchor {
 3:      children [
 4:          Shape {
 5:              geometry Sphere { radius 2 }
 6:          }
 7:      ]
 8:      url "test.html"
 9:      description "LINK to test.html"
10:  }
```

As shown is the above example, an object with a link stretched thereto is treated as a child node included in the definintion of an Anchor node, one of the Group nodes. The name of a file at the destination of the link is described in an url field of the Anchor node. A string of characters described in a description field is displayed while a mouse pointer is in contact with the object.

12 Setting a Light For setting a light in a world by using version 2.0 of the VRML, there are provided 3 nodes, namely, DirectionalLight, PointLight and SpotLight. A technique of setting a light is exemplified by the PointLight node. In the following example, in order to make the radiation of a light easy to understand, the object is rotated on line 3.

Sample 10

```
1:  #VRML V2.0 utf8
2:  Transform {
3:      rotation 1 0 0 0.75
4:      children [
5:          PointLight {
6:              location002#
7:          }
8:          Shape {
9:              geometry Cylinder {}
```

-continued

Sample 10

```
10:           }
11:       ]
12:   }
```

The visibility of the object varies in dependence on the position of a light source defined on line 6. In this example, the light source is placed in front of the object.

13 World Environment (1)

The description given so far mainly explains creation of an object. The following description briefly explains how to use a node for purposes other than creation of an object. The term "world environment" is used arbitrarily even though there is no assurance as to whether or not the usage of the term is proper.

First of all, an attempt is made to turn off HeadLight provided as a default value in the browser. The ON and OFF states of HeadLight can be determined by an option of the browser or set by a description in a file.

Sample 11

```
1:  #VRML V2.0 utf8
2:  NavigationInfo {
3:      headlight FALSE
4:  }
5:  Transform {
6:      children [
7:          Shape {
8:              appearance Appearance {
9:                  material Material { diffuseColor 100 }
10:             }
11:             geometry Sphere {}
12:         }
13:     ]
14: }
```

In the above example, a FALSE option of the browser is specified for turning off HeadLight. It is thus obvious that this example provides a very dark screen in comparison with the examples given so far. Since HeadLight is a light radiated in a direction seen by the user, without such a light, the screen looks dark.

A new NavigationInfo node is added on Lines 2 to 4. The state of HeadLight can be set ON or OFF by setting TRUE or FALSE in a headlight field in this node. By turning off HeadLight and setting any arbitrary light, brightness can be set effectively.

14 World Environment (2)

The NavigationInfo node is provided with some other fields. One of the fields is a type field for changing the method of navigation.

By default, a WALK method is adopted as a navigation method. Other navigation methods are a FLY method for moving by ignoring a gravitational force, an EXAMINE method whereby an object is moved eliminating the need for the user to walk and a NONE method allowing no control whatsoever. By the way, the WALK method is a navigation method for moving while experiencing the effect of a gravitational force.

Sample 12

```
1:  #VRML V2.0 utf8
2:  NavigationInfo {
3:      type EXAMINE
4:  }
5:  Transform {
6:      children [
7:          Shape {
8:              appearance Appearance {
9:                  material Material { diffuseColor 100 }
10:             }
11:             geometry Box {}
12:         }
13:     ]
14: }
```

In the above example, the EXAMINE method is selected as a navigation method. When an object is dragged by using a mouse, the object is rotated.

15 Appending a Title on a Scene

In the HTML, a title can be appended by enclosing the title with a <title> tag. If this tag is not specified, a title is displayed with a path http://ryol.is.kochi-u˜howto3.htm11]. Also in the case of the VRML, the same thing happens. In the examples given so far, since a title is not specified, a path is displayed. A title is specified in the VRML by using a WorldInfo node.

Sample 13

```
1:  #VRML V2.0 utf8
2:  WorldInfo {
3:      title "Spin Box"
4:      info["Autor H.Kan",http://ryol.is.kochi-u.ac.jp/]
5:  }
2:  NavigationInfo {
3:      type EXAMINE
4:  }
5:  Transform {
6:      children [
7:          Shape {
8:              appearance Appearance {
9:                  material Material { diffuseColor 100 }
10:             }
11:             geometry Box {}
12:         }
13:     ]
14: }
```

A WorldInfo node is added on lines 2 to 5 of the above example. The above example is the same as a previous example with a title of "Spin Box" appended. In the Plugin version, it is not displayed. It should be noted that, in an info field, information other than a title is described. However, there is no change whatsoever in the browser.

16 Changing the Position of the Visual Point

By default, the point of vision is positioned initially at a point on the z-axis in dependence on the location of the object. The initial position of the visual point can however be changed as shown in the following example.

Sample 14

```
1:  #VRML V2.0 utf8
2:  Viewpoint{ position x y z }
3:  Transform {
```

-continued

Sample 14

```
 4:     children [
 5:         Shape {
 6:             appearance Appearance {
 7:                 material Material { diffuseColor 100 }
 8:             }
 9:             geometry Sphere {}
10:         }
11:     ]
12: }
13: Transform {
14:     translation -300
15:     children [
16:         Shape {
17:             appearance Appearance {
18:                 material { diffuseColor 010 }
19:             }
20:             geometry Sphere {}
21:         }
22:     ]
23: }
24: Transform {
25:     translation 300
26:     children [
27:         Shape {
28:             appearance Appearance {
29:                 material { diffuseColor 001 }
30:             }
31:             geometry Sphere{}
32:         }
33:     ]
34: }
```

According to the above example, there are a red sphere at (0, 0, 0), a green sphere at (−3, 0, 0) and a blue sphere at (3, 0, 0). Actual coordinate values specified in a position field of a Viewpoint node on line 2 indicate the initial position of the visual point. It should be noted that the line of vision is always oriented in the direction of the z-axis.

17 Changing the Direction of the Line of Vision In sample 14, only the coordinates of the visual point are changed. It is needless to say that the direction of the line of vision can also be changed. The direction of the line of vision is specified by using a Viewpoint node. Instead of the position field, however, an orientation field is used to specify the direction of the line of vision. The orientation field is a field of the SFRotation type for specifying a value of the rotational angle formed with an additional-point axis.

18 Providing a Sensor

Nodes provided by version 2.0 of the VRML include a Sensor node for detecting a variety of things in the scene and for forming a judgment. There are all 7 types of Sensor node. In the Community Place Browser for confirming operations in a web page, some types of Sensor node are not supported yet. In the following example, a TouchSensor node is appended to an object to sense whether or not a mouse hits the object.

Sample 15

```
1: #VRML V2.0 utf8
2: Transform {
3:     children [
4:         DEF TS TouchSensor {}
5:         Shape {
6:             geometry Box {}
7:         }
```

-continued

Sample 15

```
8:     ]
9: }
```

The difference between this example and the examples given before is line 4 only. On line 4, a TouchSensor node named TS is appended to a Box. When a mouse cursor is brought into contact with the Box, the shape of the cursor should change to the shape of the hand provided that the browser in use is the Community Place Browser. In another browser, the shape of the cursor may not change in some cases. In such a case, by the way, nothing will happen even if the mouse is clicked.

19 Adding a Behavior (1)

Version 2.0 of the VRML is much different from version 1.0 in that, in the case of the former, a behavior can be added to a scene. In order to add a behavior, there are provided 2 methods, namely, a method using a Java script written in Java or a VRML script written in the VRML and a method using an Interpolator node.

First of all, an overview of the method using an Interpolator node is briefly explained. By the way, the verb interpolate means to thrust in or to insert. A behavior can be added by changing a numerical value, a position, 3D coordinates, a direction, a normal line and/or a color by means of an Interpolator node. In the following example, an object is rotated by using an OrientationInterpolator node for inserting a direction.

Sample 16

```
 1: #VRML V2.0 utf8
 2: DEF OBJ Transform {
 3:     children [
 4:         Shape {
 5:             geometry Box { size 2 3 1 }
 6:         }
 7:     ]
 8: }
 9: DEF TS TimeSensor {
10:     cycleInterval 1
11:     loop TRUE
12:     stopTime -1
13: }
14: DEF 01 OrientationInterpolator {
15:     key [0, 0.125, 0.25, 0.375, 0.5,
16:         0.625, 0.75, 0.875, 1,]
17:     keyValue [0 1 0 0, 0 1 0 0.785, 0 1 0 1.57,
18:         0 1 0 2.355, 0 1 0 3.14, 0 1 0 -2.355,
19:         0 1 0 -1.57, 0 1 0 -0.785, 0 1 0 0 ]
20: }
21: ROUTE TS.fraction_changed TO 0I.set_fraction
22: ROUTE 0I.value_changed TO OBJ.set_rotation
```

First of all, a name is assigned to each of some nodes. As shown in the above example, names OBJ, TS and OI are defined on lines 2, 9 and 14 respectively. They are required when an event is passed as will be described later.

Then, take a look at lines 9 to 13. TimeSensor is a node for sensing the lapse of time. TimeSensor is capable of generating events at fixed time intervals with the lapse of time. A loop field is an SFBool field which can have the Boolean value TRUE or FALSE. In the case of TRUE, the loop continues till stopTime is reached. In this case, since the time is between startTime having a default value of 0 and (stopTime-1), that is, a value smaller than stopTime, the loop continues indefinitely. In order to make a rotary behavior slower, the value of cycleinterval is increased.

The OrientationInterpolator node is described on lines 14 to 20. Each Interpolator node has 2 fields, namely, key and keyvalue fields. The key field sets animation interval times at values in the range of 0 to 1.

The keyvalue field sets an actual field value of an MFRotation type in an interval set by the key field. In the above example, the animation time interval is divided into 9 equal segments to set a rotation angle with the y-axis used as a center.

By using only the OrientationInterpolator node, however, a behavior can not be added to a scene. It is also necessary to pass an event generated by the TimeSensor node to the OrientationInterpolator node. Take a look at lines 21 and 22. On a line starting with a keyword ROUTE, an event is passed.

When the TimeSensor node named TS is activated, fraction_changed experiences an event-out operation, that is, fraction_Changed is generated as an outgoing event. When fraction_changed is generated as an outgoing event, fraction_changed experiences an event-in operation to set_fraction of the OrientationInterpolator node named OI, that is, fraction_changed is passed to set_fraction of the OrientationInterpolator node named OI as an incoming event. The event-out and event-in operations are carried out on line 21 starting with the keyword ROUTE. On line 22, the OrientationInterpolator node named OI interpolates a value from the value of set_fraction experiencing the event-in operation on line 21, carrying out an event-out operation on the interpolated value to a translation field of the Transform node named OBJ as value_changed.

Another example is given as follows.
20 Adding a Behavior (2)

Sample 17 is an example in which an object moves when clicked by using the mouse. In the behavior of the object, a PositionInterpolator node for interpolating a position is used.

Sample 17

```
1:  #VRML V2.0 utf8
2:  DEF OBJ TRANSFORM {
3:      children [
4:          DEF TS TouchSensor {}
5:          Shape {
6:              appearance Appearance {
7:                  material Material { diffuseColor 100 }
8:              }
9:              geometry Box {}
10:         }
11:     ]
12: }
13: DEF TIS TimeSensor { cycleInterval 5 }
14: DEF PI PositionInterpolatior {
15:     key[0, 0.2, 0.4, 0.6, 0.8, 1.0]
16:     keyvalue[0 0 0, 0 0-2, 0 2 -4, 0 4 -6, 2 4 -6, 4 2 -6]
17: }
18: ROUTE TS.touchTime TO TIS.set_startTime
19: ROUTE TS.fraction_changed TO PI.set_fraction
20: ROUTE PI.value_changed TO OBJ.set_translation
```

In the above example, a TouchSensor node named TS is added to a red cube named OBJ. When the object is clicked, touchTime of the TouchSensor node named TS experiences an event-out operation to startTime of a TimeSensor node named TIS. In the source description of the above example, a startTime field is not included in the TimeSensor node. However, a default value 0 of startTime is used. The rest of the above example can be interpreted in the same way as the previous example.

On each of the lines starting with the keyword ROUTE, the object is moved.

The following is a brief description of a mechanism for implementing an autonomous behavior in a VRML virtual space, a new function added to VRML 1.0, the first generation of the VRML, to result in VRML 2.0, the second generation of the VRML.

With VRML 2.0, an autonomous behavior of an object placed in a 3-dimensional virtual reality space (or a virtual space) can be implemented in accordance with an event generated to accompany an operation carried out on the object or a timer event which occurs at a point of time or a period of time determined in advance lapses. A mechanism for realizing such a behavior is implemented by 3 elements, namely, a sensor, a routing and a script which work in concert with each other.

To put it in detail, the 3 elements work as follows.

(1) A sensor node described as a VRML file and associated with a node of an object placed in a 3-dimensional virtual reality space in advance senses an external event from a change in field value, generating an event in a VRML scene.

(2) The generated event is propagated to an external script, that is, a program prescribing a behavior of the object, through a routing also described as a VRML file.

(3) The external script includes a method described in advance. The method is called at a point of time an identified event arrives through the routing. Receiving the propagated event, the external script carries out processing based on the script description and then changes the value of a field of a node associated with the object in a VRML scene on the basis of a result of the processing and the description of the routing.

Sensor nodes provided by VRML 2.0 typically include a TouchSensor node, a ProximitySensor node and a TimeSensor node. A TouchSensor node generates an event when a pointing device passes through a specified object or when the user clicks the object. A ProximitySensor node generates an event when ViewPoint, the visual point of the user, intrudes into a specified area and a TimeSensor node generates an event at a specified point of time or each time a period of time specified in advance lapses.

The construction of a behavior is explained in slightly more detail as follows. As described before, the construction of a Behavior comprises a sensor, an event, a routing, and a script generated by the sensor and propagated to the script through the routing.

There are 2 types of sensor, namely, a sensor of a type for sensing an operation carried out by the user and a sensor of a type for sensing a change occurring in the system.

A sensor of a type for sensing an operation carried out by the user is a switch implemented by software associated with an object placed in a 3-dimensional virtual space. On the other hand, a sensor of a type for sensing a change occurring in the system is a timer which is actuated at a point of time set in advance or when a period of time set in advance lapses. A sensor of either type detects an external event, converting the detected external event into an internal VRML event.

In actuality, a n event is data for propagating information among internal VRML nodes. To put it concretely, a change in field value described in a VRML file is propagated as an event.

A routing is a construction for specifying which node an event detected by the function of a sensor is to be delivered to. In actuality, a routing specifies a propagation route through which an event conveying information is to be propagated.

A script is a functional block with an entrance and an exit. An event entering a script through the entrance thereof is subjected to some computations outputting a result through the exit as another event. The description of a script is not limited to a specific language. At the present stage, however, languages that can be used for describing a script include Java and JavaScript drawing much attention in the Internet world, the C language widely used for an ordinary system, Tcl/Tk and PERL commonly used in a UNIX system and the Visual Basic language provided by Microsoft. Thus, version 2.0 of the VRML2.0 is specifications not depending on a specific script language. During a study of the VRML2.0 specifications, there was once proposed an idea to adopt VRML script as language specifications for a script. However, this idea was given up.

Next, a means for processing a Behavior is explained by referring to FIG. 1, a model diagram showing processing of a Behavior. A flow of a processing signal from a step to another is explained as follows.

(1) Sensor Node

As described before, there are 2 types of sensor, namely, a sensor of a type for sensing an operation carried out by the user and a sensor of a type for sensing a change occurring in the system.

The former sensor is described as a sensor node such as a TouchSensor node or a PlaneSensor node which senses an operation to click a 3-dimensional object or the plane surface of such an object by means of a mouse or an operation to let a pointing device pass through such an object or such a plane surface as an event. As the latter sensor, on the other hand, there is provided a TimeSensor node with a construction which is capable of generating an event when a predetermined point of time is reached or a predetermined period of time lapses.

In the example shown in FIG. 1, a TouchSensor node is appended to a sphere object. An operation carried out by a user to click the sphere is detected by the TouchSensor node as an event. The event is detected as a change in value of an eventout field in the TouchSensor node. Normally, an operation carried out by the user to click the sphere one time generates 2 events with timing of pressing the mouse button and timing of releasing the button respectively.

Then, the event is propagated at a routing step shown in FIG. 1 in accordance with a routing description.

(2) Routing

The routing of the event is specified by a Route declaration shown in FIG. 2.

The event generated by the sensor description is propagated to an eventout field of the Route declaration to be further delivered to a script node which will be described later. As a result, the event is passed to an external script file for implementing the Behavior function.

(3) Script Node

The script node plays an interface role between the VRML file and the external script file. The description format of a script node indicates which language is used for writing the external script file and specifies the name of the file. In addition, the script node prescribes eventIn and eventout fields for allowing an event to be propagated from a VRML file to an external script file. The external script file that can be used may be written in one of languages such as Java, JavaScript, the C language, Tcl/Tk, PERL and the Visual Basic language to mention a few.

In the actual processing, an event propagated through the routing is passed to an external script file specified by the script node and the external script file is then executed. To put it in detail, the event is received by eventIn, that is, an event entrance defined in the external script file, and processing described in the file is carried out. A result of the processing is output from eventout, an exit for the event, to the routing to the VRML file. The VRML file executes the returned result, completing a sequence of Behaviors.

By utilizing a Behavior mechanism implemented by the sensor, the routing and the script working in concert with each other as described above, for example, an operation, for example, to click an object representing a switch located in a 3-dimensional virtual reality space by means of a mouse allows the external appearance such as the shape, the posture, the size and the color of another object placed in the same space or a sequence of behaviors to be changed.

A detailed description of this Behavior mechanism is described in Section 4 with a title "Concept" of the ISO/IEC CD 14772 Specification Sheet of version 2.0 of the Virtual Reality Modeling Language dated Aug. 4, 1996 which is disclosed at http://webspace.sgi.com/moving-worlds/spec/part1/concepts.html with its Japanese translation disclosed at http://www.webcity.co.jp/info/andoh/VRML/vrml2.0/specjp/part1/concepts.html. This section explains a concept serving as a key to utilization of the VRML specification sheet. To be more specific, the description given in this section includes general items regarding a variety of nodes such as a technique to link a node to a scene graph, a technique adopted by a node to generate and receive an event, a technique to create a node type by a prototype, an export technique for adding a node type to the VRML and allowing the node type to be used externally and a technique of including a script working as a program in a VRML file.

The following is a description of a technology of displaying a shared virtual space realized by application of a mechanism implementing autonomous Behaviors of VRML 2.0 described above.

FIG. 3 is a diagram showing the configuration of a complete system implemented by an embodiment of the present invention. By a system, a logical set of a plurality of apparatuses is meant without regard to whether or not the apparatuses are accommodated in a cabinet.

In FIG. 3, reference numerals 1, 2 and 3 each denote a client PC (personal computer) wherein a VRML browser and a WWW browser are installed and operate. The PCs 1, 2 and 3 are connected to the Internet 7 by ISP (Internet-connected service providers) 4, 5 and 6 respectively.

A LAN (Local Area Network) 9 is connected to the Internet 7 by a router 8. Connected to the LAN 9 are a WWW server 10, a WLS (World Location Server) 11, a shared server 12, AO (Application Object) servers 13 and 14, a mail server 15 and a communication server 16. The WWW server 10 is provided with hard disc (HDD) 10a and 10b whereas the other servers 11 to 16 have HDDs 11a to 16a respectively.

The communication server 16 is connected to a telephone set 18 and a facsimile device 19 by a public telephone-line network 17, to a PHS (Personal Handyphone System) terminal 23 by radio communication by way of a PHS service provider 20 and to a pocket-bell (pager) terminal 24 by radio communication through a pocket-bell service provider 21.

Figure 4:
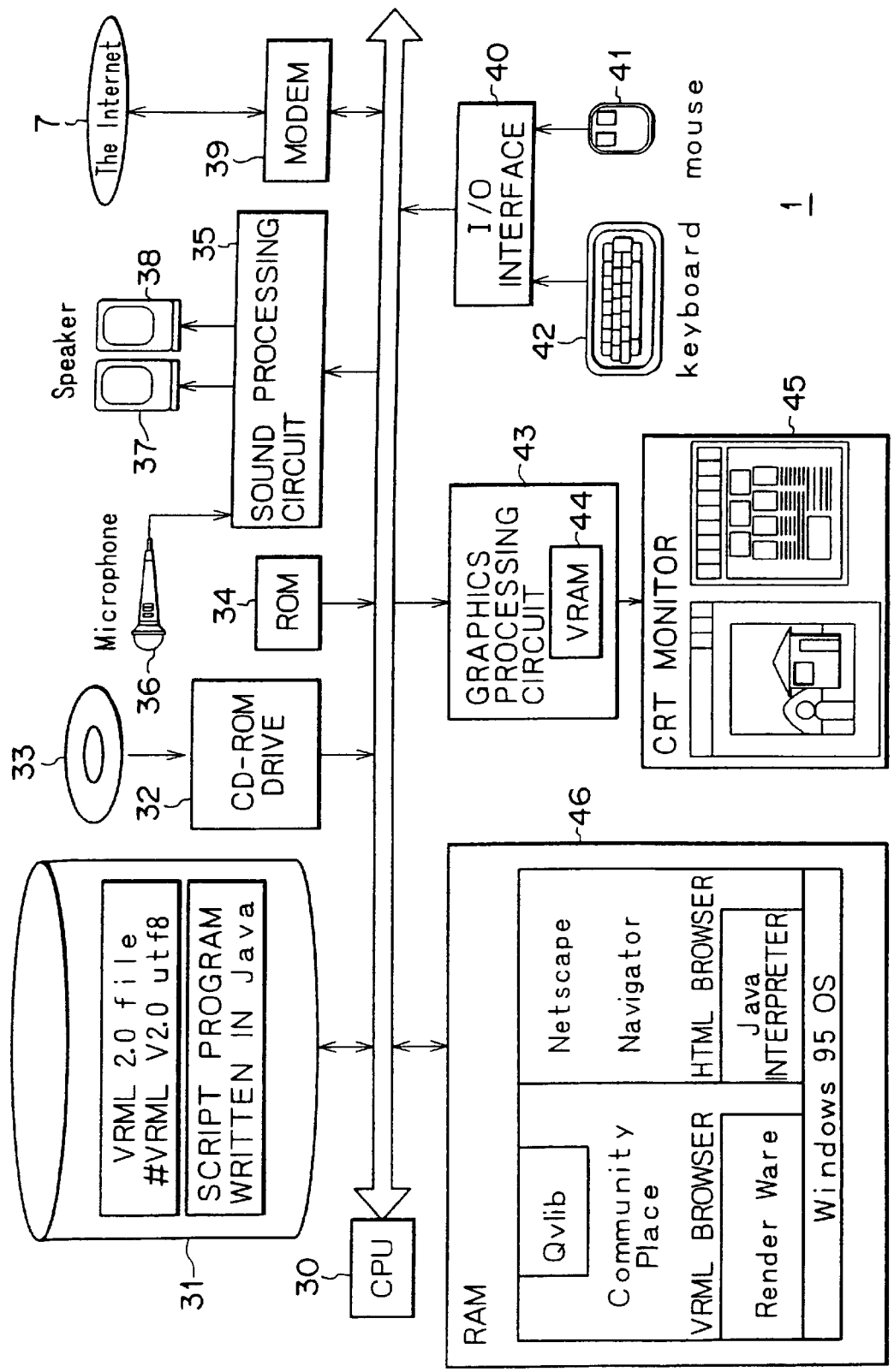
FIG. 4 is a block diagram showing a typical configuration of a client PC 1 employed in the system shown in FIG. 3.

FIG. 4 is a block diagram showing the hardware configuration of the client PC 1 employed in the system shown in FIG. 3.

In FIG. 4, reference numeral 30 denotes a CPU for controlling other components of the client PC 1 and reference numeral 31 denotes an HDD for storing a file of VRML 2.0 and VRML contents such as a script program written in Java (a trademark of Sun Microsystems, a US company). Reference numeral 32 is a CD-ROM drive for reading out VRML contents stored in a CD-ROM disc 33 and reference numeral 34 is a ROM unit for storing programs such as a BIOS (Basic Input/Output Systems). Reference numeral 35 denotes a sound processing circuit connected to a microphone 36 as well as speakers 37 and 38 installed on the left and right sides respectively. Reference numeral 39 is a MODEM for communication with the Internet 7 and reference numeral 40 denotes an I/O (Input/Output) interface unit connected to a mouse 41 and a keyboard 42. Reference numeral 43 denotes a graphic processing circuit including an embedded VRAM unit 44. Reference numerals 45 and 46 are a CRT monitor and a RAM unit respectively.

In the operation of the client PC 1, the Netscape Navigator, a WWW browser, a JAVA interpreter and the Community Place Browser, a browser of VRML 2.0 developed by Sony, which all operate under Windows 95 (a trademark of Microsoft, a US company), are loaded into the RAM unit 46 to be executed by the CPU 30.

The browser of VRML 2.0 implements QvLib, a library or a purser for interpreting statements of the VRML syntax developed and disclosed gratuitously by silicon Graphics, a US company, and RenderWare, a software renderer developed by Criterion Software Ltd. of Great Britain, or a purser and/or renderer having functions equivalent to QvLib and RenderWare.

As shown in FIG. 3, the Community Place Browser exchanges various kinds of data with the Netscape Navigator serving as a WWW browser through an NCAPI (Netscape Client Application Programming Interface) which is another trademark.

When the Netscape Navigator receives a HTML file or VRML contents including a VRML file and a script program written in Java from the WWW server 10 by way of the LAN 9, the router 8, the Internet 7 and the IP 4, the HTML file of the VRML contents are stored locally in the HDD 31. The Netscape Navigator then processes the HTML file, displaying texts and pictures on the CRT monitor 45. On the other hand, the Community Place Browser processes and displays a 3-dimensional virtual space on the CRT monitor 45. At the same time, the Community Place Browser changes behaviors of objects in the 3-dimensional virtual space and other display states in accordance with results of processing of a script program carried out by the Java interpreter.

It should be noted that, while the configurations of the other client PCs 2 and 3 are not shown in the figure, they are the same as that of the client PC 1.

Next, the operation of the embodiment described above is explained.

Figure 5:
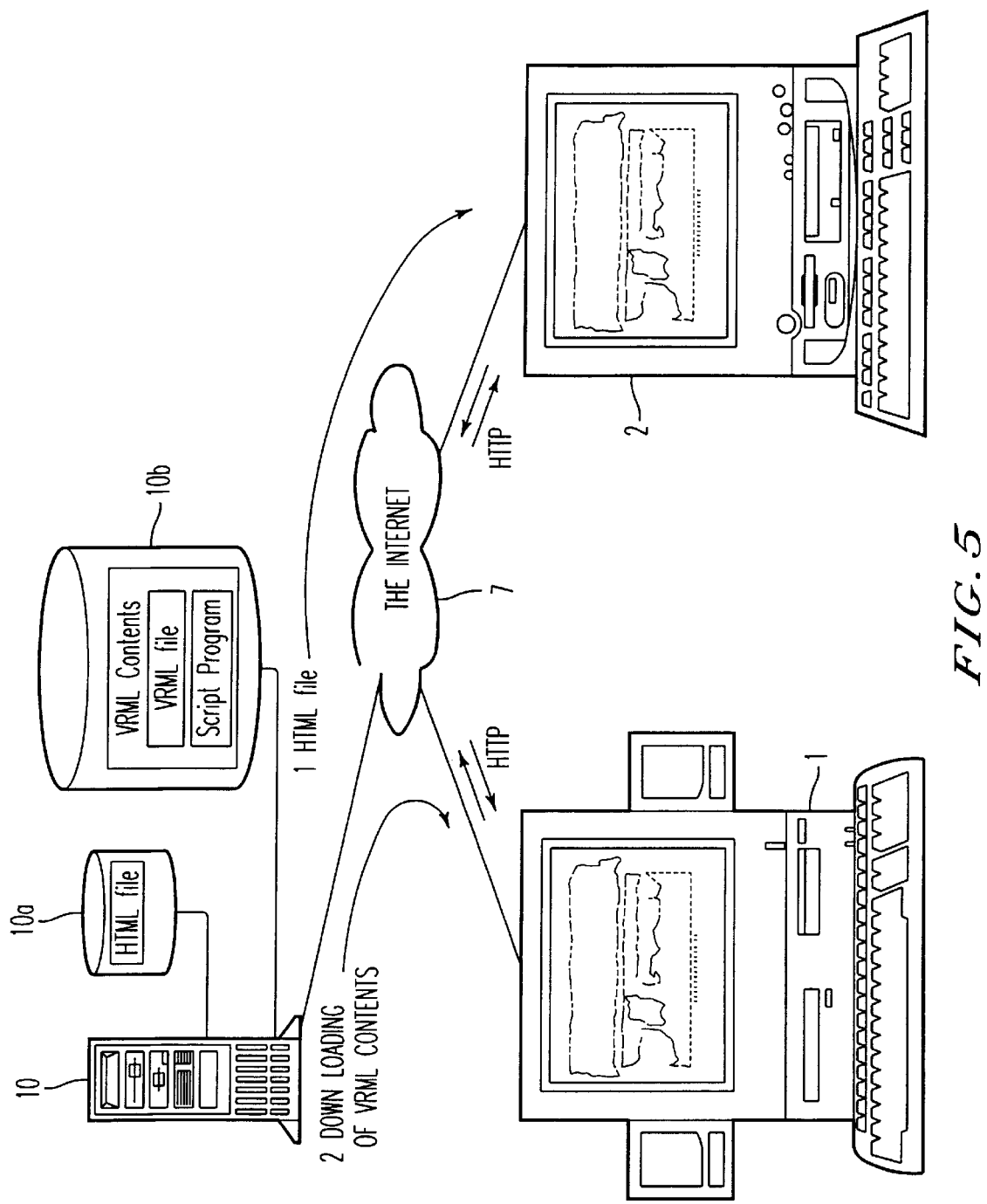
FIG. 5 is a photograph showing a displayed screen used for explaining the operation of the system shown in FIG. 3.
Figure 6:
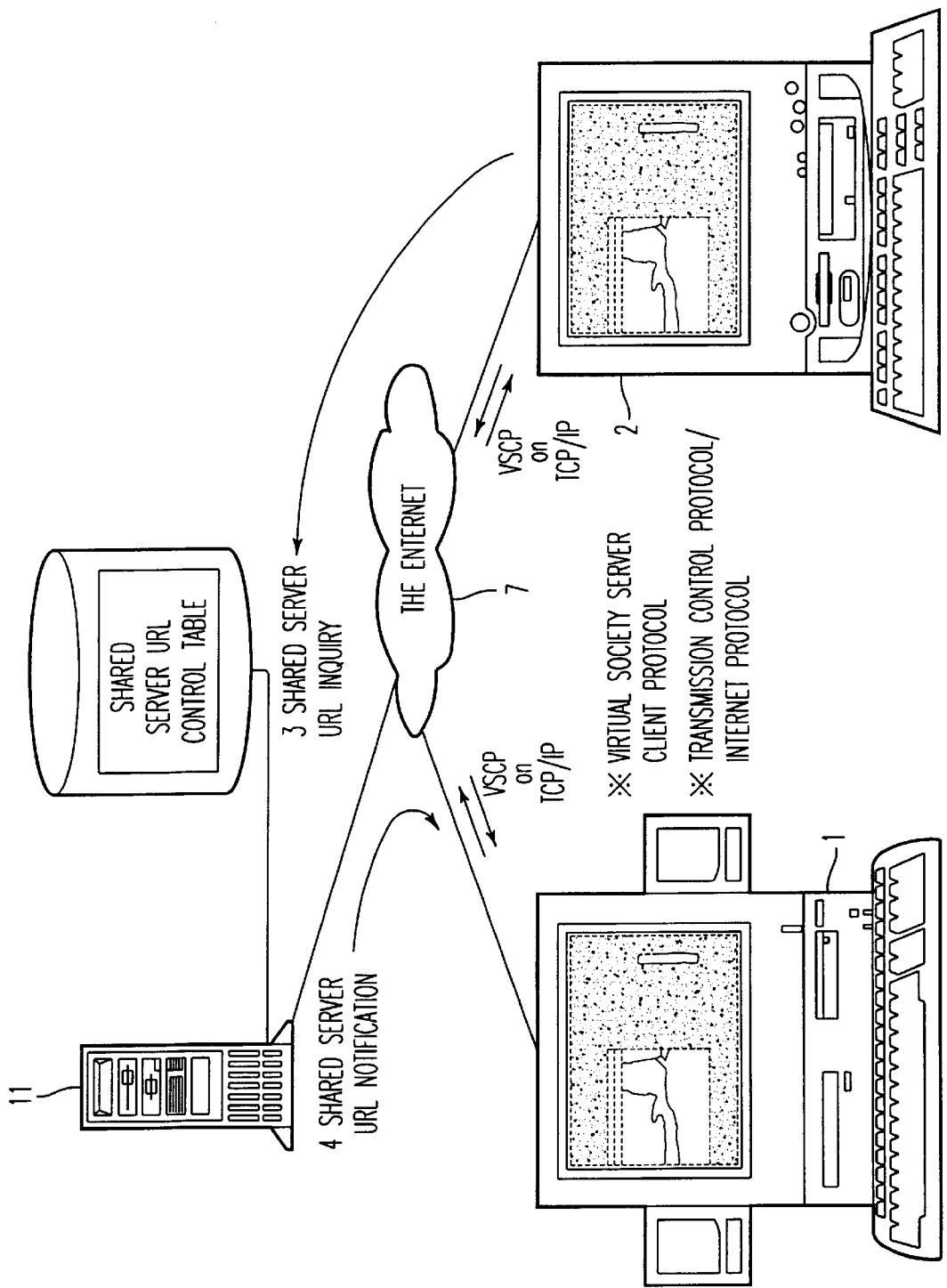
FIG. 6 is another photograph showing a displayed screen used for explaining the operation of the system shown in FIG. 3.
Figure 7:
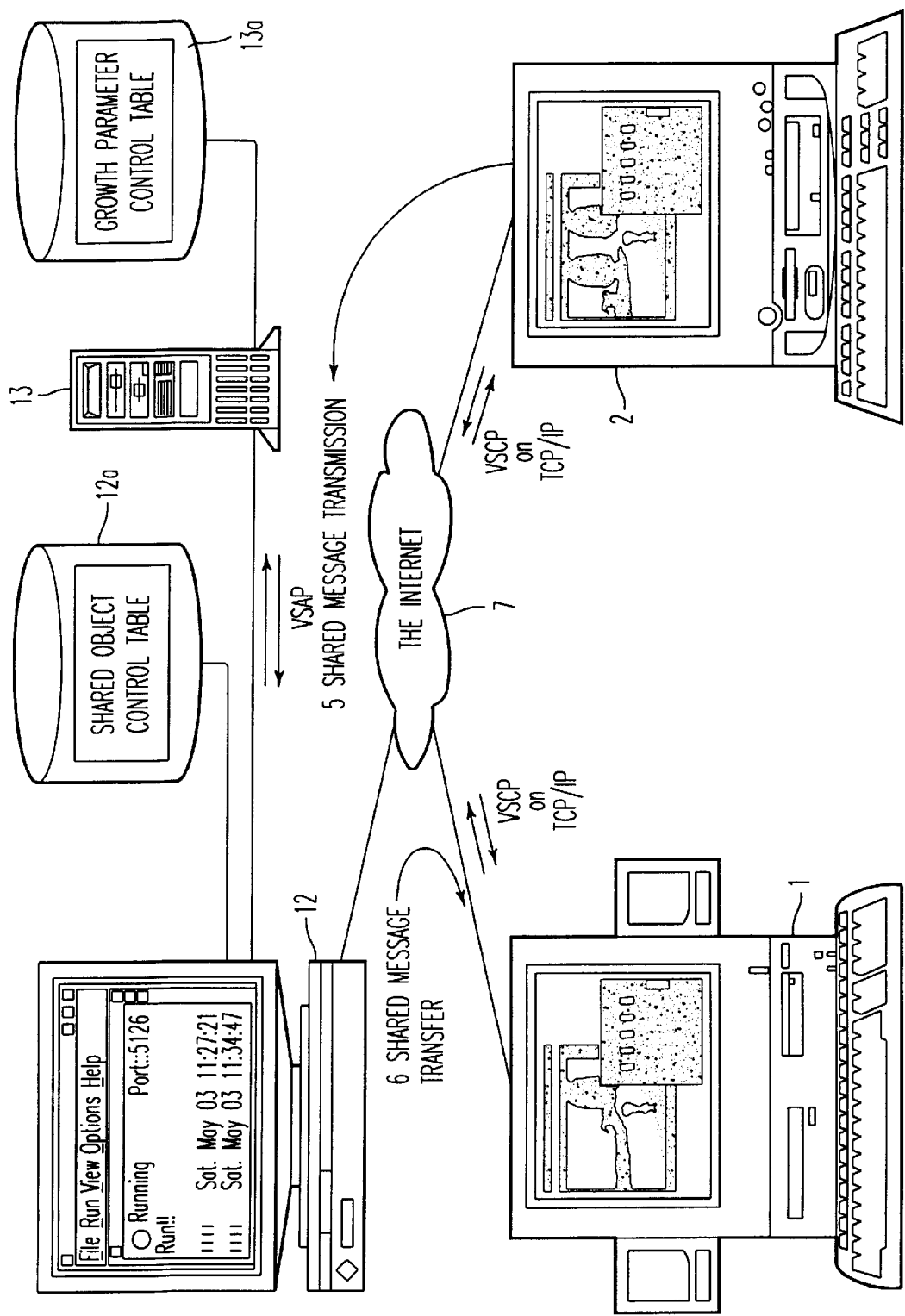
FIG. 7 is still another photograph showing a displayed screen used for explaining the operation of the system shown in FIG. 3.

The explanation begins with a description of a procedure followed after VRML contents are actually down loaded to establish a multi-user environment wherein a virtual space is shared by a plurality of users with reference to FIGS. 5 to 7.

At step ① shown in FIG. 5, initially, a home page of a web site providing VRML contents is viewed by using the WWW browser. In this example, http://pc.sony.co.jp/sapari/ is viewed. Then, at step ②, the users of the client PCs 1 and 2 down load VRML contents, which comprise a file of VRML 2.0 and a script program written in Java to implement an autonomous Behavior in a VRML space, to the respective hard discs 31.

It is needless to say that VRML contents that are presented through a CD-ROM disc 33 are just read out by the CD-ROM drive 32.

Then, as shown in FIG. 6, in each of the client PCs 1 and 2, the file of VRML 2.0 down loaded and temporarily stored in a local HDD 31 thereof is interpreted for execution by the Community Place Browser serving as a browser of VRML 2.0. Subsequently, at step ③, an inquiry about a URL of the shared server 12 is made to the WLS 11 in accordance with a VSCP (Virtual Society Server Client Protocol). Then, at step ④, the WLS 11 refers to a shared server URL control table stored in the HDD 11a, informing the client PCs 1 and 2 of the URL of the shared server 12.

By using this URL, the client PCs 1 and 2 are connected to the shared server 12 as shown in FIG. 7. As a result, at step ⑤, a shared message regarding the position and the behavior of a shared 3D object is transmitted by way of the shared server 12 and, at step ⑥, their transfers are carried out to establish a multi-user environment.

It should be noted that, for a detailed explanation of the connection procedure described above, refer to Japanese Patent Laid-open No. Hei9-81781.

As described above, the 3-dimensional virtual space is used in a multi-user environment. However, the space can also be prevented from being used in a multi-user environment, that is, the use of the space is limited to what is properly called a single-user environment. To put it in detail, the avatar of a user other than the user of a PC on which the 3-dimensional virtual space is displayed is prevented from appearing in the space and, at the same time, the avatar of a user is prevented from appearing in a 3-dimensional virtual space of another user. Such a single-user environment is implemented by skipping the pieces of processing carried out at steps ③ to ⑥ described above.

Figure 8:
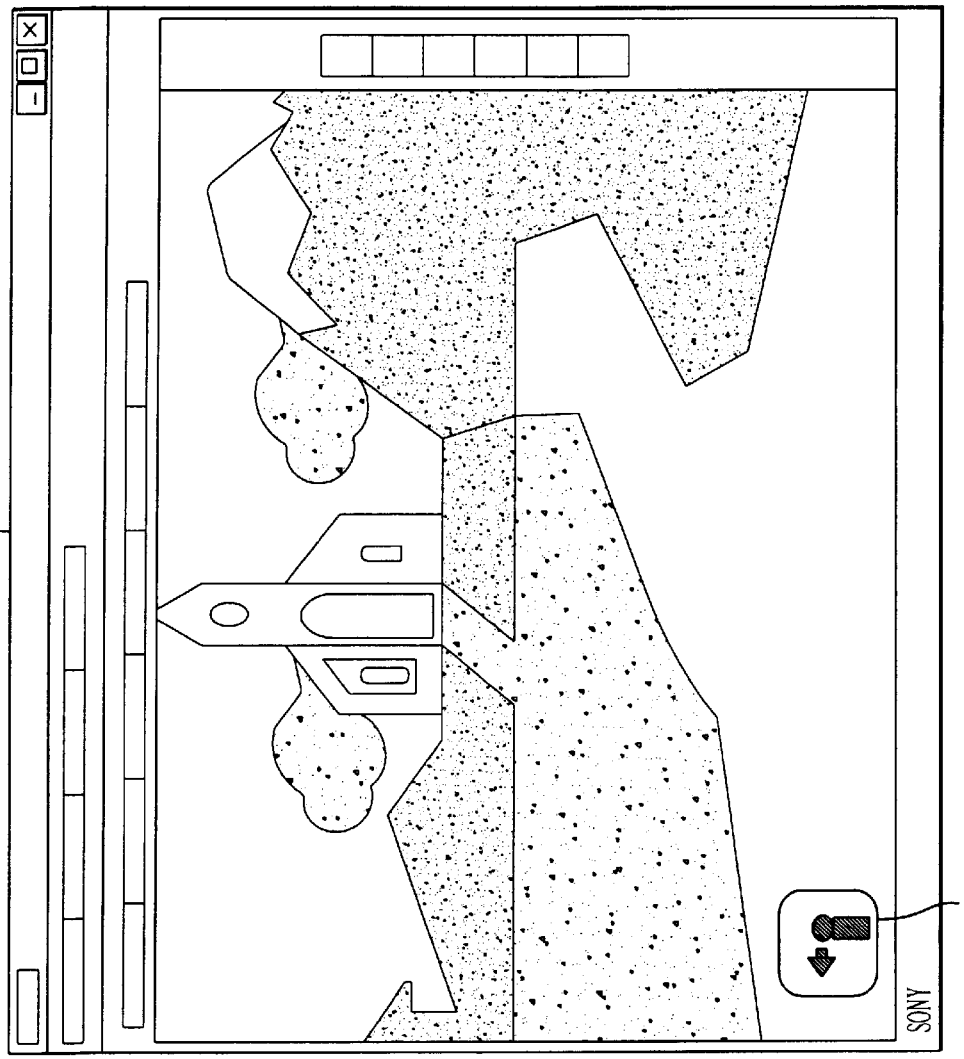
FIG. 8 is a photograph showing a screen displayed by a browser of the client PC.

As explained earlier by referring to FIG. 6, when the Community Place Browser serving as a browser of VRML 2.0 interprets a file of VRML 2.0 in a PC for execution, the picture of a 3-dimensional virtual space like for example one shown in FIG. 8 is displayed.

In the case of the embodiment, a hypothetical camera is assumed as a photographing means for photographing a 3-dimensional virtual space and the picture of the 3-dimensional virtual space is provided by the browser of VRML 2.0 as a result of photographing the 3-dimensional virtual space. It is also possible to switch from a first-person mode to a third-person mode and vice versa. The first-person mode is a state wherein the point of vision of a pilot avatar representing the user itself, that is, its own object, coincides with the position of the camera. On the other hand, the third-person mode is a state wherein the point of vision of a pilot avatar representing the user itself does not coincide with the position of the camera.

FIG. 8 shows a displayed screen in the first-person mode wherein the point of vision of a pilot avatar representing the user itself coincides with the position of the camera. The visual point of the pilot avatar includes both the coordinates of a point at which the eye of the pilot avatar in the 3-dimensional virtual space is positioned and the direction of sight or the direction of the line of vision. On the other hand, the position of the camera includes both the coordinates of a point at which the eye of the pilot avatar in the 3-dimensional virtual space is positioned and the photographing direction. In the first-person mode, the user is capable of walking about through the 3-dimensional virtual space with a high degree of freedom at the visual point of the pilot avatar representing the user itself. Thus, in the first-person mode, the user is not capable of seeing the figure of the pilot avatar representing the user itself. In a multi-user environment, however, the user is capable of seeing the figure of a drawn avatar of another user if such a drawn avatar exists.

Figure 18:
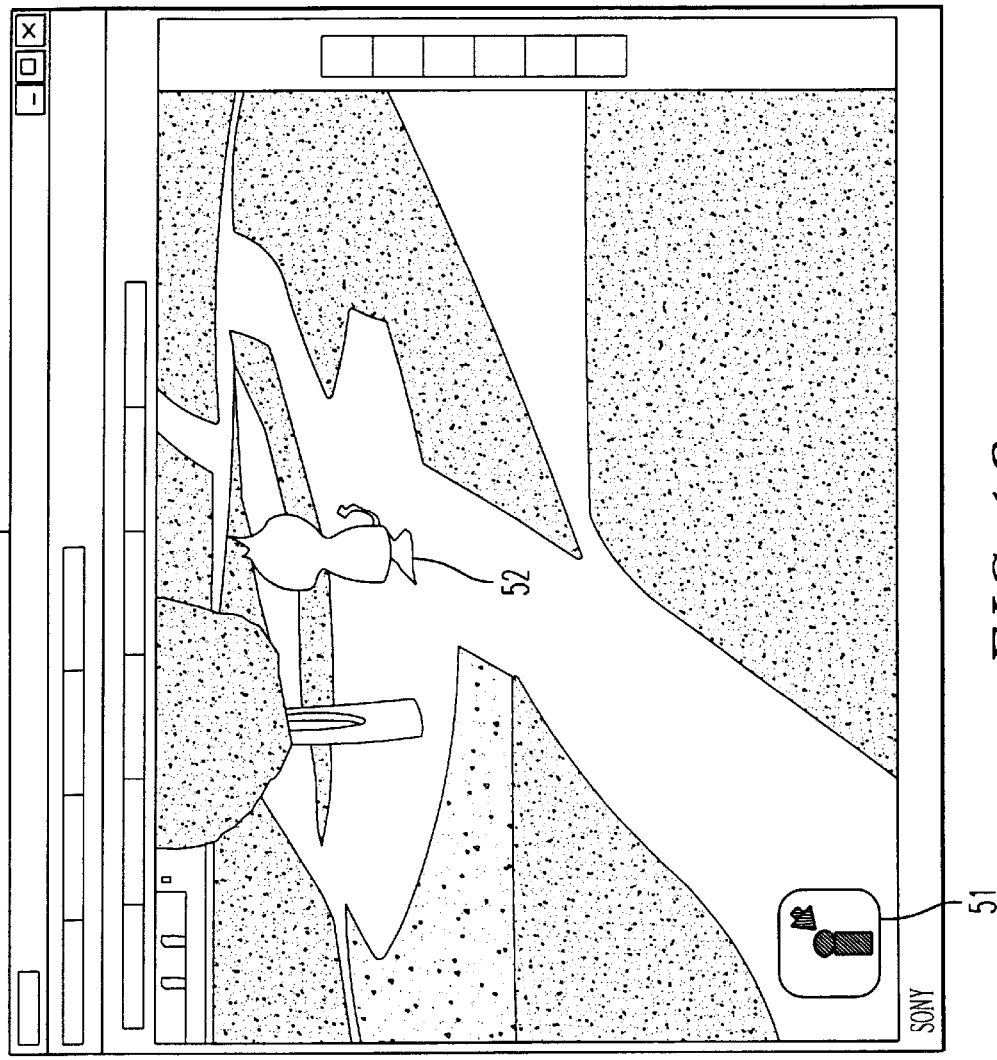
FIG. 18 is a photograph showing a screen displayed by the browser.

The first-person mode can be switched to a third-person mode and vice versa by operating a switch button 51 shown at the lower left corner of the browser screen shown in FIG. 8 or the screen of FIG. 9 or 18 to be described later. The switch button 51 is operated typically by clicking the mouse 41. As shown in FIG. 8, in the first-person mode, the switch button 51 is displayed as a symbol indicating that the 3-dimensional virtual space is seen from the visual point of the pilot avatar, allowing the user to recognize the first-person mode with ease. In such a state, operating the switch button 51 will cause switching to occur from the first-person mode to the third-person mode.

Figure 9:
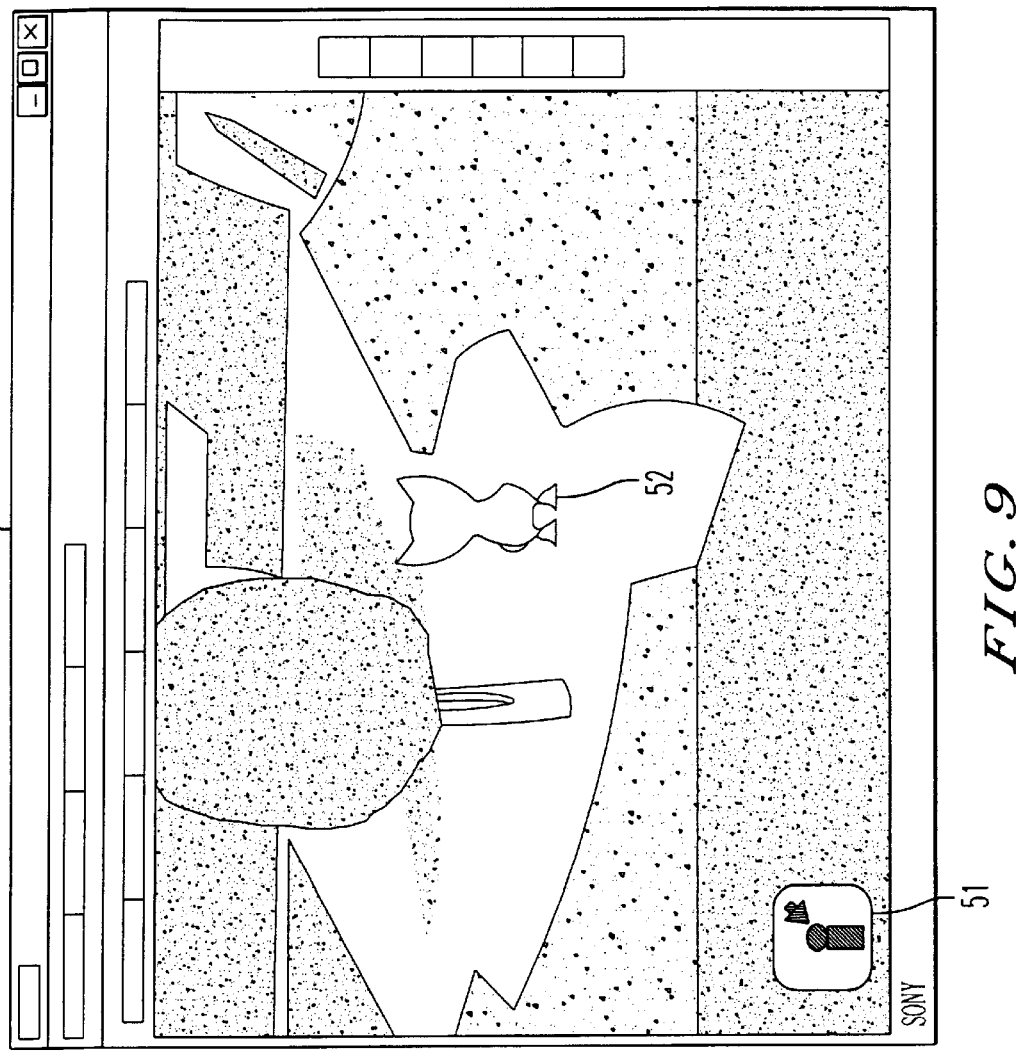
FIG. 9 is a photograph showing another screen displayed by the browser.

FIG. 9 shows a display state of the browser in the third-person mode.

In the third-person mode, the visual point of the pilot avatar does not coincide with the position of the camera. As will be described later, however, a standard position of the camera is computed right after the occurrence of the switching from the first-person mode to the third-person mode. The camera is then moved to the computed standard position. As a result, a picture of the 3-dimensional virtual space seen from a position behind and above the head of the pilot avatar 52 representing the user itself is typically displayed as shown in FIG. 9. That is to say, there is displayed a picture illustrating a state as if the pilot avatar 52 representing the user had departed from the body of the user as a soul so to speak and, then, the user turning into a soul were seeing the pilot avatar 52 representing the user itself.

As shown in FIG. 9, in the third-person mode, the switch button 51 is displayed as a symbol indicating that the 3-dimensional virtual space is seen from a position behind and above the pilot avatar, allowing the user to recognize the third-person mode with ease.

Thus, in the first-person mode and the third-person mode which can be switched from one to another, the user is capable of feeling respectively a sense as if the user were present in the 3-dimensional space, walking about through the virtual world, and feeling a sense as if the user had departed from the body of the user as a soul, that is, as if the user had turned into a soul so to speak, seeing the behavior of the user present in the virtual world.

It should be noted that, in this embodiment, switching from the first-person mode to the third-person mode or vice versa takes place each time the switch button 51 is operated. Thus, operating the switch button 51 in the third-person mode shown in FIG. 9 will cause the screen to switch from the third-person mode back to the first-person mode shown in FIG. 8.

The switching from the first-person mode to the third-person mode described above is implemented by a transition of a state in which the visual point of the pilot avatar, that is, the position of the eye of the pilot avatar, coincides with the position of the camera to a state of the former not coinciding with the latter as described above. Nodes for implementing the state transition are defined as follows.

In the first place, the visual point of the pilot avatar is prescribed by a Sony_Eyepoint node which is typically defined below. It should be noted that name Sony_Eyepoint is appropriately described hereafter simply as Eyepoint.

EXTERNPROTO Sony_Eyepoint[exposedField MFNode children[] ]

["urn:inet:vrml.sony.co.jp:Sony_Extension:Sony_Eyepoint",

"http://vrml.sony.co.jp/Sony_Extension.wrl#Sony_Eyepoint]

PROTO Sony_Eyepoint [exposedField MFNode children [] ]

```
DEF TR_EP Transform {
    rotation 0010
    children IS children
}
}
```

In an avatar file prescribing an avatar, a Eyepoint node can be described. An operation carried out by the browser to read in a wrl file, that is, an avatar file prescribing a pilot avatar, allows the pilot avatar to be generated internally. The internal configuration is written in the VRML as follows:

```
DEF TR_PILOT Transform {
    children [ Inline {url"xxx.wrl"} ]
}
```

Thus, generation of a pilot avatar is or should be equivalent to declaration of an avatar file as Inline. In the above example, xxx.wrl is the avatar file.

It should be noted that, since HeadLight is generated in the browser, it is not necessary to describe HeadLight in an avatar file. As for directions of a pilot avatar, the +y direction and the +z direction of a world coordinate system of the avatar file, a local coordinate system prescribed in the Transform node named TR_PILOT in the above example, are taken as the upward direction and the forward direction respectively.

Typically, a navigation operation, that is an operation of the mouse 41 carried out by the user, allows a pilot avatar to walk about through a 3-dimensional virtual space. That is to say, when the user carries out a navigation operation, translation and rotation fields of the Transform node defined with a name of TR_PILOT are changed, causing the pilot avatar to move through the 3-dimensional virtual space. It should be noted that an access to TR_PILOT from the VRML-contents side cannot be made. It is thus impossible to move the pilot avatar and to know its position by adopting a technique violating rules prescribed by version 2.0 of the VRML. In addition, the translation and rotation fields of the Transform node can also be changed by using a function of a Viewpoint node prescribed in version 2.0 of the VRML besides the navigation operation carried out by the user.

As described above, an Eyepoint node is described in an avatar file. The Eyepoint node represents the position of the eye of the pilot avatar when the avatar file is read in as a file prescribing a pilot avatar. The position of the eye of the pilot avatar is normally fixed on the body of the pilot avatar such as the head of the pilot avatar. Thus, the eye does not move except when performing a special performance such as protruding the eyeball.

Here, as for directions of the pilot avatar's line of vision, the +y direction and the −z direction of a TR_EP coordinate system prescribed in the Eyepoint node are taken as the upward direction and the forward direction, that is, the direction of the line of vision, respectively. That is to say, the direction of the line of vision is set to coincide with a default direction of a Viewpoint node of VRML 2.0. It should be noted, however, that it is not always necessary to make the direction of the line of vision coincident with a default direction.

The Eyepoint node is made effective only within a main file of the avatar. In addition, an Eyepoint node can be described in an avatar file as described above. If a plurality of Eyepoint nodes are described therein, only the node described first, that is, the head node, is effective in conformity with a binding mechanism of version 2.0 of the VRML.

In a children field of the Eyepoint node, a direction which needs to be made to coincide with the direction of the pilot avatar's line of vision is normally described. As will be described later, the position of a camera is prescribed by a Sony_Renderingpoint node. By making a Sony_Renderingpoint node at a place pointed to by a children field of an Eyepoint node, the Sony_Renderingpoint node can be made coincident with the Eyepoint node, that is, the position of the camera can be made coincident with the visual point of the pilot avatar. As a result, a first-person mode can be established.

It should be noted that, in case not even one Eyepoint node is described in an avatar file, a default Eyepoint node is added when the avatar file is read in. For this reason, the internal structure of the pilot avatar is described as follows.

```
DEF TR_PILOT Transform {
    children [
        Inline {url"xxx.wrl" }
        DEF TR_EP_POSITION Transform {
            translation 0 1.6 0
            rotation 0 1 0 3.141592
            children[Sony_Eyepoint{}]
        }
    ]
}
```

In the default Eyepoint node, the pilot avatar is assumed to have the form of a standard adult wherein the eye of the pilot avatar is provided at an altitude of 1.6 m. It should be noted that the altitude of 1.6 m is a value matching a default height called "the position of the visual point" prescribed by avatarSize of NavigationInfo. If NavigationInfo is described explicitly, the translation and rotation fields of TR_EP_POSITION, the name of a Transform node in the pilot avatar are set in accordance with values prescribed in NavigationInfo. In this way, the position of the eye of the pilot avatar, that is, the Eyepoint node, can be made coincident with data described in NavigationInfo.

It should be noted that, in a pilot avatar with the default Eyepoint node added thereto, the rotation field of TR_EP_POSITION is set at a value that rotates the position of the eye, that is, the Eyepoint node, by 3.141592 or the value of π (180 degrees). Since the direction of the pilot avatar's line of vision prescribed in the Eyepoint node coincides with the −z direction in the local coordinate system as described above, the position of the eye is rotated in order to make the front direction of the pilot avatar coincident with the direction of the line of vision.

An Eyepoint no de described in an avatar file is bound when the avatar file is read in. In case an Eyepoint is not described in an avatar file, an Eyepoint node is automatically added and bound when the avatar file is read in. Thus, even if an Eyepoint node is generated at execution time, that is, even if an Eyepoint node is added to a scene graph of the pilot avatar, nothing will occur in particular. This is because an Eyepoint node is based on a binding mechanism as described above.

Furthermore, an access cannot be made to an Eyepoint node from the VRML-contents side. Thus, a bound Eyepoint node can be deleted at execution time only if the Eyepoint node is described in the avatar file from the beginning. If a bound Eyepoint node is deleted at execution time, the default Eyepoint node is added like the case with no Eyepoint node described in the avatar file. Thus, a bound default Eyepoint node cannot be deleted from the VRML-contents side.

Even if the local coordinate system itself which includes a bound Eyepoint node is changed or moved, that is, even if a behavior is displayed at a hierarchical level higher than the so-called parent Transform node of the Eyepoint node, an algorithm adopted in events such as a navigation operation carried out by the user and a behavior of the pilot avatar caused by the binding of the Viewpoint node can be applied as it is, making it unnecessary to specially operate the Eyepoint node.

The pilot avatar with a bound Eyepoint node is driven by a navigation operation carried out by the user to move in a 3-dimensional virtual space or a virtual world. The behavior of the pilot avatar is explained as follows. It should be noted that, according to specifications of VRML 2.0, the upward direction in a navigation operation is prescribed to be the +y direction of a local coordinate system to which a Viewpoint node pertains. In the following description, the prescription of this upward direction is assumed. In addition, a viewpoint node prescribed by version 2.0 of the VRML shows a so-called destination to which the position of the camera is to be moved at a time the node is bound. Thus, at a moment the Viewpoint node is bound, viewpoint coincides with the position of the camera. If the pilot avatar is moved by a navigation operation, however, Viewpoint does not coincide with the position of the camera any more. It should be noted that the instantaneous position of the camera can be fetched by using the ProximitySensor node as an event.

A behavior of the pilot avatar in a state wherein a certain Viewpoint node is bound and the bound Viewpoint node is not changed is interpreted as a behavior in a local coordinate system to which the pilot avatar pertains, that is, a local coordinate system prescribed by a Transform node including TR_PILOT. Such a local coordinate system is appropriately referred to hereafter as a pilot behavior space coordinate system.

If the pilot avatar is moved in the forward direction, that is, if a navigation operation is carried out to move the pilot avatar in the forward direction, for example, the pilot avatar moves over an xz plane in the horizontal direction of the pilot behavior space coordinate system in the browser. To put it concretely, the x and z values of the translation field of TR_PILOT are updated. It should be noted, however, that this behavior of the pilot avatar is based on the assumption that there is neither gravitational force nor range of mountains on the earth. If there is a gravitational force or a range of mountains on the earth, on the other hand, the y value is also updated.

If the pilot avatar is rotated in the pan direction, for example, the value of the rotation field of TR_PILOT is updated in the browser.

Furthermore, if the head of the pilot avatar is moved up and down, for example, the rotation field of TR_EP defined in the Eyepoint node is updated in the browser. As a result, the visual point or the line of vision of the pilot avatar is moved up and down.

It should be noted that, here, an access from the VRML-contents side cannot be made to the translation and rotation fields of TR_PILOT as well as the rotation field of TR_EP which are updated to implement a behavior of the pilot avatar. In order to change the values of these fields, that is, in order to change the position, orientation and the visual point of the pilot avatar or to know them, it is thus necessary to use a technique prescribed in version 2.0 of the VRML.

If a certain Viewpoint node is bound, a local coordinate system including this Viewpoint node becomes a pilot behavior space coordinate system. In this case, the state (transformation) of the pilot avatar is adjusted as follows.

The pilot avatar is always erected in the vertical direction in the pilot behavior space coordinate system. Thus, the pilot avatar is rotated in the pan direction in the pilot behavior space coordinate system instead of being rotated in the tilt and roll directions. That is to say, the pilot avatar is not inclined in the tilt and roll directions. In addition, at a moment the Viewpoint node is bound, the Eyepoint node, that is, the Visual point of the pilot avatar, coincides with a direction and a point or a position specified in the Viewpoint node. Furthermore, the Eyepoint node rotates in the tilt and roll directions instead of rotating in the pan direction with respect to the pilot avatar. For a given direction in the pilot behavior space coordinate system with respect to the pilot avatar, the pan direction is adjusted by TR_PILOT whereas the tilt and roll directions are adjusted by the Eyepoint node.

Speaking in terms of senses, the pilot avatar is perpendicular to the body all the time. In addition, in spite of the fact that sometimes the head of the pilot avatar is inclined or the pilot avatar bows its head, the pilot avatar never shakes its head in the horizontal direction.

In the above discussion, the jump field of the Viewpoint node is assumed to have a Boolean value of "TRUE". In the case of a bound Viewpoint node with its jump field set at a Boolean value of FALSE, on the other hand, the directions are adjusted so that the +y direction of a local coordinate system to which the newly bounded Viewpoint node pertains, that is, the +y direction of a new pilot behavior space coordinate system, coincides with the upward direction of the pilot avatar. It should be noted, however, that the Eyepoint node and the position of the pilot avatar in the world coordinate system are not changed.

The position of the camera is prescribed by a Sony_Renderingpoint node which is defined as follows. It should be noted that the Sony_Renderingpoint node is appropriately referred to hereafter simply as Renderingpoint.

the node is bound. On the other hand, the position and orientation fields of a Renderingpoint node represent the position of the camera following the pilot avatar in a real-time manner. That is to say, the position of the camera can be found by reading out the values of the position and orientation fields of a Renderingpoint node.

A DirectionalLight node named HEAD_LIGHT in the Renderingpoint node is a head light (DirectionalLight) of parallel beams defined by NavigationInfo.headlight prescribed in version 2.0 of the VRML. It is impossible to make an access to DirectionalLight from the Renderingpoint node. For this reason, HEAD_LIGHT is explicitly described in the Renderingpoint node in order to make the orientation or the direction of the head light always coincident with the direction of Renderingpoint.

A type field in the Renderingpoint node is used for indicating whether or not to operate an automatic follow-up function of the camera, that is, whether or not to drive the camera to follow the pilot avatar. If the word "MANUAL" is specified in the type field, the automatic follow-up function of the camera does not work. In this case, the browser never changes the values of the position and orientation fields of the Renderingpoint node arbitrarily. If the word "AUTO" is specified in the type field, on the other hand, the automatic follow-up function of the camera works. In this case, the browser automatically changes the values of the position and orientation fields of the Renderingpoint node so as to drive the camera to follow the pilot avatar.

It should be noted that, with the word "AUTO" specified in the type field, the camera is moved in accordance with the value of a parameter field in the Renderingpoint node. Interpretation of the parameter field is dependent on the browser. The above definition of the Renderingpoint node includes a prescribed phrase of SEE_PILOT_BACK which means positioning of the camera above and behind the head

```
EXTERNPROTO Sony_Renderingpoint[exposedField SFVec3f position
                                exposedField SFRotation orientation
                                exposedField SFString type
                                exposedField SFString parametaer] ]
["urn:inet:vrml.sony.co.jp:sony_Extension:Sony_Renderingpoint",
"http://vrml.sony.co.jp/Sony_Extension.wrl#Sony_Renderingpoint]
        exposedField SFVec3f position 0 0 0
        exposedField SFRotation orientation 0 0 1 0
        exposedField SFString type "MANUAL"        # "AUTO"
        exposedField SFString parameter " "        # "SEE_PILOT_BACK"
]{
        DEF TR_RP Transform{
            translation IS position
            rotation IS orientation
            children[
                DEF HEAD_LIGHT DirectionlLight{}
            ]
        }
}
```

If fields of the Renderingpoint node are each set at a default value, the forward and upward directions of the camera are set to be coincident with the -z and +y directions respectively. The browser displays a picture obtained as a result of photographing a 3-dimensional virtual space in a direction specified by an orientation field of the Renderingpoint node from a point specified by a position field of the node by using the camera. This picture matches a picture that is displayed at a moment the Viewpoint node is bound. It should be noted, however, that the position and orientation fields of a Viewpoint node are each a field specially used to only write for setting the visual point of the user at a moment of the pilot avatar. As described above, since the interpretation of the parameter field is dependent on the browser, for example, a phrase of SEE_PILOT_FRONT can be prescribed further to mean positioning of the camera above and in front of the head of the pilot avatar. In this case, if the setting of the phrase SEE_PILOT_BACK or SEE_PILOT_FRONT in the parameter field is allowed, the position of the camera can be controlled by the browser from the VRML-contents side.

Here, the Renderingpoint node is effective only within a main file of the avatar or a main file of the world. In addition, if a plurality of Renderingpoint nodes are described in a main file, only the first one is effective in conformity with the binding mechanism of VRML 2.0. Furthermore, if a Renderingpoint node is described in main files of both the avatar and the world, only one of them, for example, the one described in the main file of the world, is effective.

If a Renderingpoint node is not described explicitly in the main file, the default Renderingpoint node is generated as a children node of the Eyepoint node of the pilot avatar. The default Renderingpoint node is a Renderingpoint node with default values set in the fields thereof. In this case, the Renderingpoint node coincides with the Eyepoint node. That is to say, a point or a direction prescribed by the Renderingpoint node coincides respectively with a point or a direction prescribed by the Eyepoint node. Then, when the user carries out a navigation operation or when a new Viewpoint node is bound, the Renderingpoint node moves in the same way as the Eyepoint node. Since the movement of the Renderingpoint node changes the position of the camera, that is, the point at which the camera is located and the direction, in the browser, the navigation operation and the state of the behavior of the pilot avatar due to the binding of the new Viewpoint node, that is, a 3-dimensional virtual space visible due to the behavior of the pilot avatar, are displayed interactively.

The first-person mode can be implemented by making the Renderingpoint node coincident with the Eyepoint node or by setting fields of the Renderingpoint node at their default values. On the other hand, the third-person mode can be implemented by making the Renderingpoint node not coincident with the Eyepoint node or by setting fields of the Renderingpoint node at values other than their default values. To put it concretely, by setting the position field of the Renderingpoint node at a point on the upper, left and front side and the orientation field of the node in a direction of seeing the origin from this point, for example, the browser displays a picture as if the user looks out over the pilot avatar from a point on the left side behind the pilot avatar in a slanting direction. If a navigation operation is carried out in this state, the pilot avatar will move about through the 3-dimensional virtual space. However, the browser displays a picture of a state in which the walking-about pilot avatar is fixed at the same position on the screen. As a background of the picture, the 3-dimensional virtual space changes in accordance with the behavior of the pilot avatar.

Thus, by changing the position and orientation fields of the Renderingpoint node by VRML contents to reflect the behavior of the pilot avatar, for example, it is possible to implement the so-called camera work based on VRML contents to display pictures obtained as a result of photographing the pilot avatar walking about through the 3-dimensional space from a variety of angles. It is worth noting that, even in this case, the pilot avatar is fixed at the same position on the screen. Note, however, that this holds true of a case in which the Renderingpoint node is described in an avatar file, that is, the main file of the pilot avatar. If the Renderingpoint node is described in the main file of the world, on the other hand, it is possible to control which position on the screen the pilot avatar is to be displayed without regard of the behavior of the pilot avatar.

That is to say, if the pilot avatar is moving to the inner side, for example, with the Renderingpoint node described in the avatar file, the browser displays a picture wherein the display position of the pilot avatar does not change and the scenery of the surroundings is moving in the forward direction. With the Renderingpoint node described in the main file of the world, on the other hand, the camera is not moved and the browser displays a picture wherein the pilot avatar is moving to the inner side, becoming gradually smaller.

Next, operations carried out at execution time on the Renderingpoint node are explained.

If the Renderingpoint node is not explicitly described in the avatar file and the main file of the world, the Renderingpoint node is generated when the avatar file is read in as a children node of the Eyepoint node. In this case, the VRML contents do not operate the Renderingpoint node itself. On the VRML-contents side, it is thus sufficient to merely consider an effect of an operation of the Eyepoint and Viewpoint nodes on the Renderingpoint node.

In addition, if the pilot avatar is moved or the point of vision (or the line of vision) is changed (or rotated) by a navigation operation carried out by the user, the Renderingpoint node is changed in accordance with the movement of the pilot avatar and the change of the visual point. It is thus unnecessary to carry out an operation in particular.

Also when a new Viewpoint node is bound, a place (position) of the Eyepoint node in a scene graph as well as its geometrical position and its direction are calculated and the Renderingpoint node is changed in accordance with results of the calculation. Also in this case, it is thus unnecessary to carry out an operation in particular.

Furthermore, when the binding of the Eyepoint node changes, the place in the scene graph is changed so that the Renderingpoint node becomes a children node of a newly bound Eyepoint node and the position of the Renderingpoint node, that is, the point at which the camera is placed and the photographing direction, is computed from the newly bound Eyepoint node. Also in this case, it is thus unnecessary to carry out an operation on the Renderingpoint node in particular.

If the Renderingpoint node is explicitly described in the avatar file or the main file of the world, on the other hand, it is unnecessary to carry out an operation on the Renderingpoint node in particular till the Renderingpoint node is deleted from the scene graph. That is to say, in this case, the Renderingpoint node is not affected by changes in position of the Viewpoint and Eyepoint nodes and changes in their binding.

In addition, if a bound Renderingpoint node is deleted from a scene graph, a Renderingpoint node is generated as a children node of an existing bound Eyepoint node. Operations carried out thereafter are the same as the case in which the Renderingpoint node is explicitly described in both the avatar file and the main file of the world.

As described above, the first-person mode is implemented by making the Renderingpoint node coincident with the Eyepoint node while the third-person mode is implemented by making the Renderingpoint node not coincident with the Eyepoint node. Next, the position of the camera, that is, the visual point of the user, is changed so that it is possible to provide the user with a more impressive sense felt as if the user had departed from its body as a soul in the third-person mode.

To put it in detail, the camera is moved in accordance with an algorithm explained below so that the pilot avatar is displayed at a position as if the user turning into a soul were looking at the behavior of the pilot avatar or a location looking anything like the position so to speak. The position of the camera is controlled from the browser side by setting the word AUTO in the type field of the Renderingpoint node and operating the automatic follow-up function of the camera so that the values of the position and orientation fields of the Renderingpoint node are changed automatically.

Since the adoption of the algorithm explained below does not assure that the pilot avatar can be displayed at the position or a location looking anything like the position, the movement of the camera can also be controlled on the VRML-contents side in some cases such as a case in which the camera is moved to a place not intended by the user creating VRML contents so that the pilot avatar can not be displayed at the position or a location looking anything like the position. The position of the camera is controlled from the VRML-contents side typically by setting the word MANUAL in the type field of the Renderingpoint node and not operating the automatic follow-up function of the camera when the pilot avatar intrudes into an area where it is desired to control the camera from the VRML-contents side.

In the third-person mode, the Community Place Browser serving as a browser of VRML 2.0 carries out processing described below on the assumption that:

(1) The range through which the pilot avatar is walking about is wide to a certain degree.

(2) The roof of a space the pilot avatar enters is high to a certain degree.

(3) A range of mountains on the horizon is not so striking.

It should be noted that the following processing is carried out typically for a case in which the phrase SEE_PILOT_BACK is specified in the parameter field in the Renderingpoint node. As described before, however, the interpretation of the parameter field is dependent on the browser. Thus, when the phrase SEE_PILOT_BACK is specified in the parameter field, the browser can be requested to carry out processing different from the processing described below.

As shown in a flowchart of FIG. 10, the processing carried out by the embodiment starts with a step S1 at which a standard position of the camera is computed on the basis of Eyepoint of the pilot avatar as will be described later. The flow of the processing then goes on to a step S2 at which the position of the camera is changed to the standard position found at the step S1. Then, the flow of the processing proceeds to a step S3 to form a judgment as to whether or not the pilot avatar has moved instantaneously.

In the case of this embodiment, the pilot avatar moves instantaneously when:

(1) The world is read in.

(2) A Viewpoint node is bound.

(3) The position and/or orientation fields of the bound Viewpoint node are updated so that the position of the pilot avatar is changed.

If the outcome of the judgment formed at the step S3 indicates that the pilot avatar has moved instantaneously, the flow of the processing goes back to the step S1 at which the standard position is computed on the basis of Eyepoint of the pilot avatar after the instantaneous movement. The pieces of processing of the steps S1 to S3 are carried out repeatedly till the outcome of the judgment formed at the step S3 indicates that the pilot avatar has not moved instantaneously.

As the outcome of the judgment formed at the step S3 indicates that the pilot avatar has not moved instantaneously, the flow of the processing continues to a step S4 to form a judgment as to whether or not Eyepoint of the pilot avatar has been moved (changed) by a navigation operation carried out by the user. If the outcome of the judgment formed at the step S4 indicates that Eyepoint of the pilot avatar has not been changed, the flow of the processing continues to a step S5 to form a judgment as to whether or not the switch button 51 has been operated. If the outcome of the judgment formed at the step S5 indicates that the switch button 51 has been operated, that is, if switching from the third-person mode to the first-person mode has taken place, the processing in the third-person mode is ended. It should be noted that, thereafter, processing is carried out in the first-person mode to make Renderingpoint coincident with Eyepoint.

If the outcome of the judgment formed at the step S5 indicates that the switch button 51 has not been operated, on the other hand, the flow of the processing goes back to the step S3 at which the same processing is repeated.

If the outcome of the judgment formed at the step S4 indicates that Eyepoint of the pilot avatar has been moved, on the other hand, the flow of the processing continues to a step S6 to compute a position to which the camera is to be moved on the basis of Eyepoint of the pilot avatar after the movement as will be described later. The position to which the camera is to be moved means a point to place the camera and the photographing direction. The position to which the camera is to be moved is referred to appropriately hereafter as a movement position of the camera. After the movement position of the camera has been found, that is, after the modified value of Renderingpoint has been found, the flow of the processing goes on to a step S7 at which the camera, that is, Renderingpoint, is moved to the movement position of the camera. The flow of the processing then goes back to the step S4 to repeat the same processing.

Figure 10:
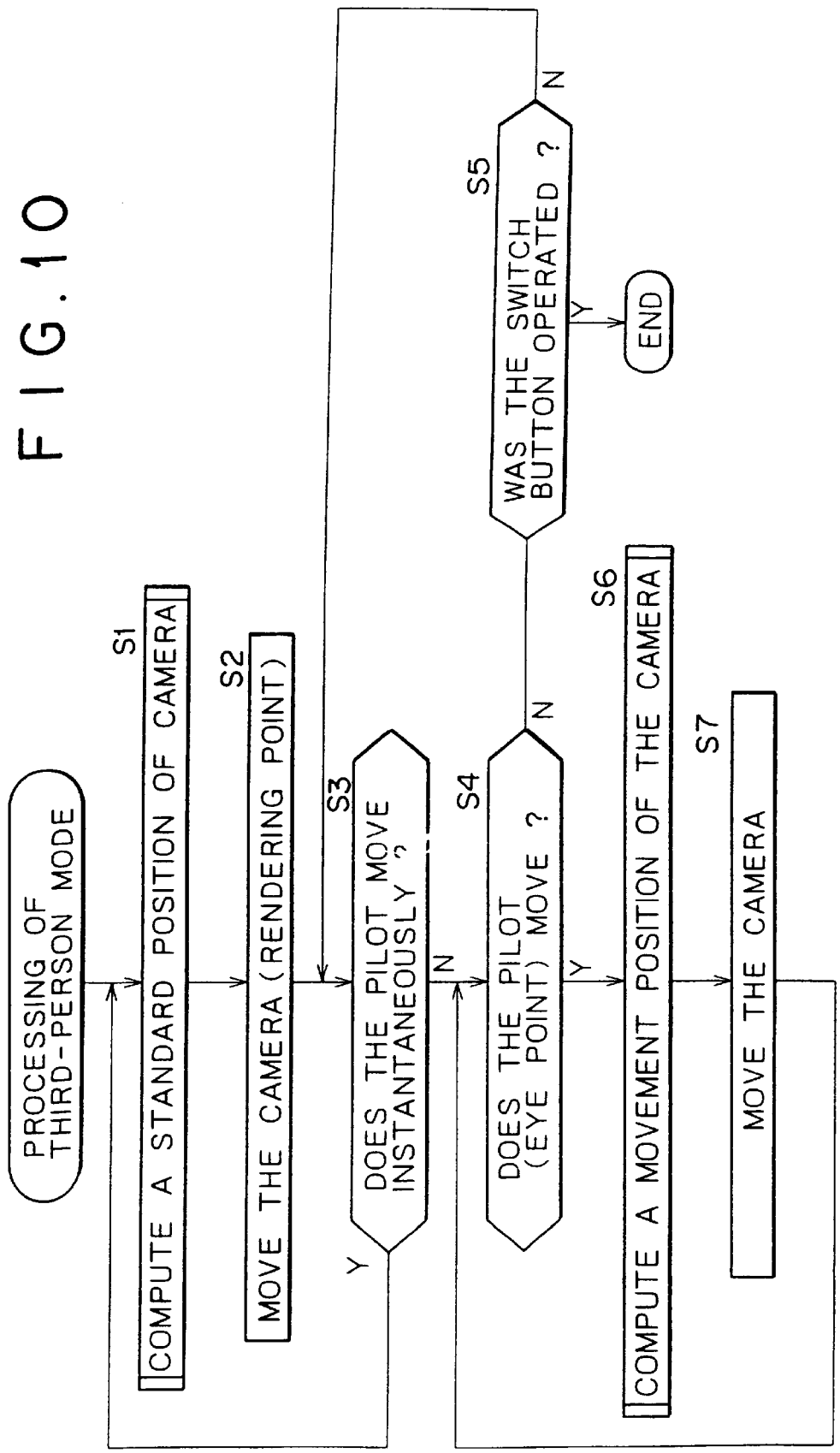
FIG. 10 is a flowchart used for explaining processing of a third-person mode.

The processing to compute the standard position of the camera carried out at the step S1 of the flowchart shown in FIG. 10 is explained in more detail by referring to FIGS. 11 and 12 as follows.

Figure 11:
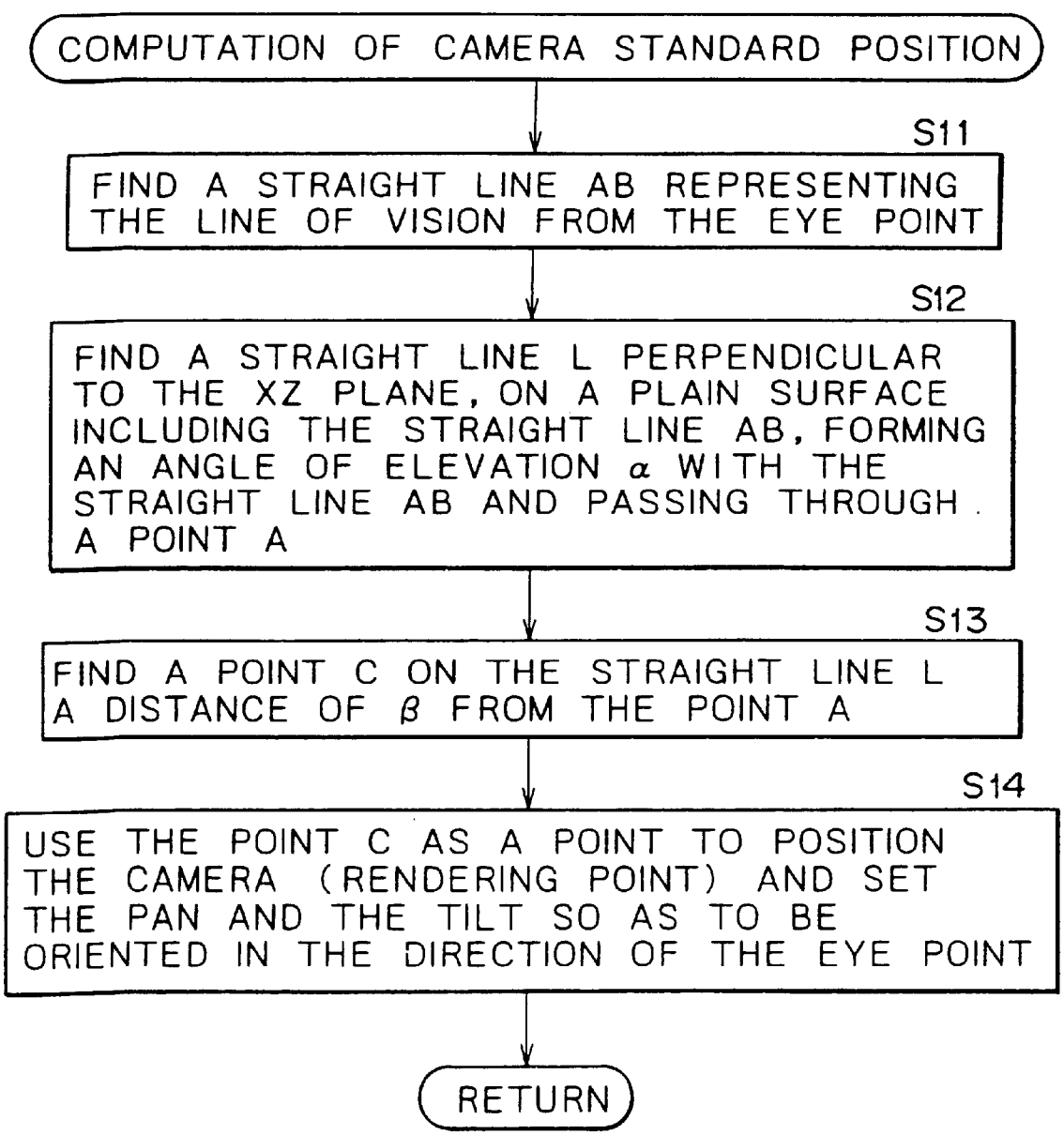
FIG. 11 is a flowchart used for explaining details of processing of a step S1 of the flowchart shown in FIG. 10.

As shown by a flowchart of FIG. 11, the processing to compute the standard position of the camera begins with a step S11 to find a straight line AB from Eyepoint coinciding with the direction of the pilot avatar's line of vision. As shown in FIG. 12, the straight line AB starts from Eyepoint and coincides with the direction of the pilot avatar's line of vision. That is to say, the straight line AB passes through the visual point of the pilot avatar in parallel to its line of vision.

The flow of processing then goes on to a step S12 to find a straight line L perpendicular to the xz plane, on a plane surface including the straight line AB, forming an angle of elevation α determined in advance with the straight line AB and passing through a point A. The flow of processing then goes on to a step S13 to find a point C on the straight line AB at a distance of β from the point A as shown in FIG. 12. How to determine the distance β will be described later. Then, the flow of the processing proceeds to a step S14.

At the step S14, the point C is used as a coordinate point representing the standard position of the camera, and a direction coinciding with the direction of Eyepoint is used as the photographing direction of the camera at the standard position of the camera. The control of execution is then returned to the flowchart shown in FIG. 10. It should be noted that, in this case, the camera is not rotated in the roll direction. Thus, the photographing direction of the camera is prescribed by pan and tilt angles.

Figure 12:
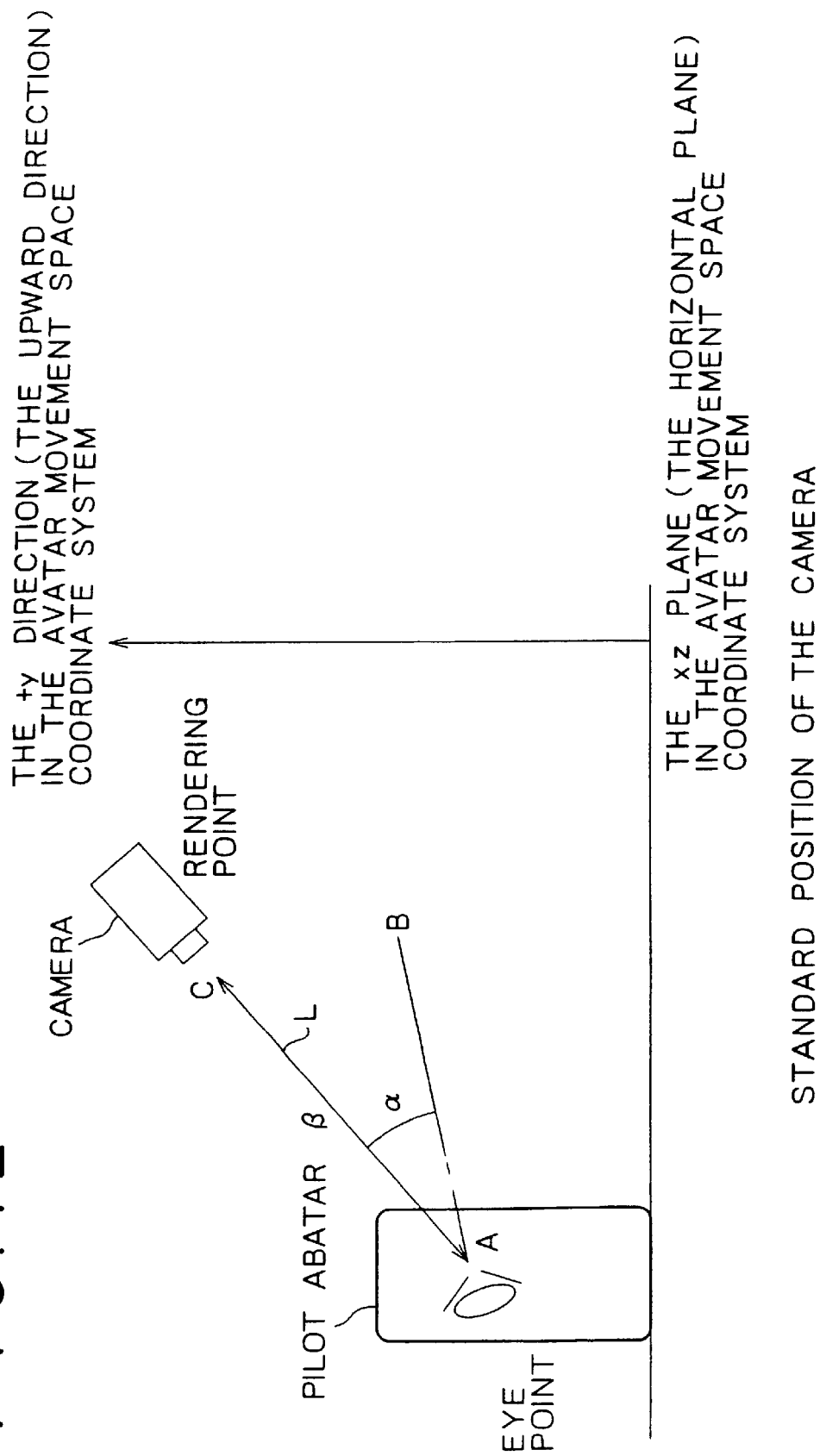
FIG. 12 is an explanatory diagram used for describing a method to compute a standard position of a camera.

The distance β shown in FIG. 12 is one of parameters prescribing the standard position of the camera. As shown in FIG. 13, β is a distance from the standard position of the camera to a position at which t he horizontal width (γ) of a picture obtained as a result of photographing by means of the camera is a predetermined number of times the horizontal width (a) of the pilot avatar. Thus, when the camera is moved to the standard position, it is possible to obtain a picture that includes scenery visible to a certain degree in the direction of the pilot avatar's line of vision in addition to the pilot avatar itself.

That is to say, FIG. 13 is a diagram showing a state in which the pilot avatar is seen by a viewer facing in the −y direction or seen from a position above the head of the pilot avatar.

Let ε be the horizontal visual-field angle of the camera and be the horizontal width of the pilot avatar. The camera is set at a point on the straight line L shown in FIG. 12. Let γ be the horizontal width of a picture obtained as a result of photographing in a direction coinciding with the direction of Eyepoint. Assume for example that γ=5a. Thus, the picture includes pieces of scenery each having a width of 2a on both the sides of the pilot avatar. Accordingly, β can be obtained by calculation using the following equation:

$$\beta = \gamma/(2 \times \tan(\epsilon/2))$$

It should be not ed that, according to version 2.0 of the VRML, ε is prescribed by a fieldOFView field of a Viewpoint node.

As described above, right after the third-person mode is set, the position of the camera is changed to the standard position in accordance with the visual point of the pilot avatar, making it possible to display a picture including scenery seen by the pilot avatar along with the pilot avatar. As a result, the user feels a sense as if the user had departed from the user's body as a soul.

It should be noted that, when the pilot avatar is seeing a direction parallel to the xz plane, a picture photographed from the standard position of the camera is a picture obtained when looking down the pilot avatar from a position above and behind the head of the pilot avatar.

In addition, normally, since Renderingpoint pertains to a coordinate system typically different from that of Eyepoint, transformation of coordinates is required in the calculation of the standard position of the camera. As will be described later, transformation of coordinates is also required in the calculation of the movement position of the camera.

Then, in a state with the third-person mode set, each time the visual point of the pilot avatar, that is, Eyepoint, is changed, the standard position is computed on the basis of changed Eyepoint and the position of the camera, that is, Renderingpoint, can be changed. In this case, the user turning into a soul would always be capable of seeing only the picture from a position behind the pilot avatar. Thus, the sense providing the user itself turning into a soul with a feeling as if the user were seeing the user itself present in the lower world may become weaker in some cases. That is to say, to be a soul, from the standpoint of sensation of the soul departing from the body, it is desirable to display a picture showing a state of tracing the back of the pilot avatar with a so-called unsteady or swaying feeling.

In order to give such an impression to the user, in the third-person mode, the camera is moved so as to display such a picture when the pilot avatar or Eyepoint moves.

To put it in detail, at the step S6 of the flowchart shown in FIG. 10, at the position of the pilot avatar after the movement, when the switching from the first-person mode to the third-person mode takes place, the movement position of the camera is found by interpolating a position between the standard position of the camera, that is, a position to which the camera is to be moved, and the position of the camera prior to the movement of the pilot avatar is as shown in FIGS. 14 and 15. The interpolated position is appropriately referred to hereafter as an interpolation position.

To put it concretely, as shown by a flowchart of FIG. 14, processing to compute the movement position of the camera begins with a step S21 at which a standard position A of the camera appropriately referred to hereafter as a new standard position of the camera is found on the basis of Eyepoint of the pilot avatar after the movement as has been described before by referring to FIGS. 11 to 13. The flow of the processing then goes on to a step S22 to find a spherical surface S with the center thereof located at a coordinate point 0 of Eyepoint of the pilot avatar after the movement and a radius OA as shown in FIG. 15. Also at the step S22, a straight line L passing through a point C, that is, the position of the camera before the movement, and the point o, as well as an intersection point B of the straight line L and the spherical surface S are found.

Then, the flow of the processing proceeds to a step S23 at which a middle point D on a line segment AB connecting the point A to the point B is found as an interpolation position as shown in FIG. 15. The interpolation position D is used as a movement position of the camera. Control of execution is then returned to the flowchart shown in FIG. 10.

It should be noted that the photographing at the movement position of the camera is orientated in the direction from the point D to the point O shown in FIG. 15 or the direction of Eyepoint of the pilot avatar after the movement.

When the camera is moved to a movement position calculated as described above, the magnitude of the movement of the camera is smaller than the magnitude of the behavior of the pilot avatar, resulting in a displayed picture which moves like the so-called animation. That is to say, the user is provided with a picture giving a sense felt as if the soul were following the pilot avatar with an amount of a motion smaller than the behavior of the pilot avatar.

Figure 16A:
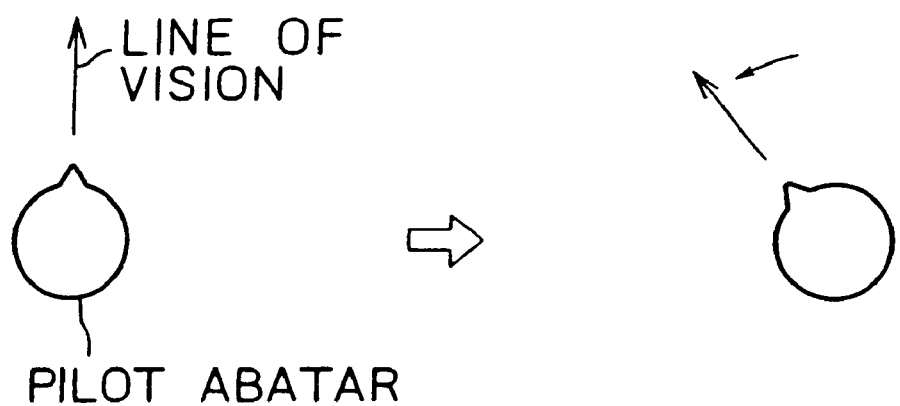
FIGS. 16A and 16B are diagrams each showing a relation between a behavior of a pilot avatar and a movement of the camera.
Figure 16B:
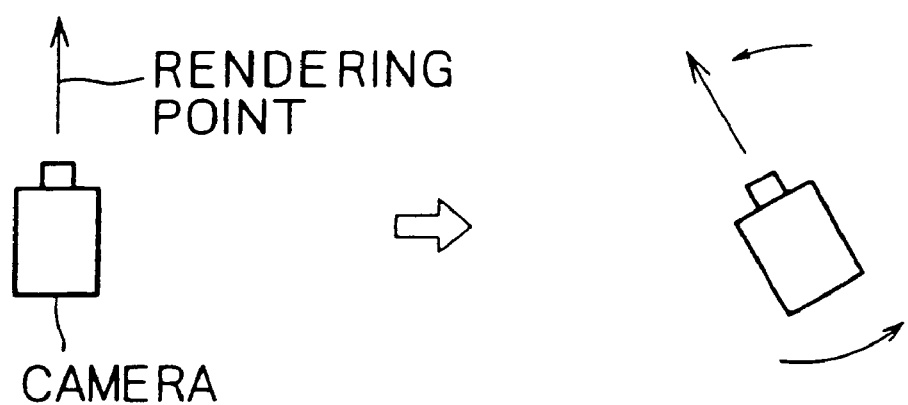

In the case described above, by the way, when the pilot avatar moves as shown in FIG. 16A for example, the camera also moves immediately as shown in FIG. 16B. Thus, the sense felt as if the soul were following the pilot avatar with a swaying feeling may not be obtained.

In order to solve this problem, when the pilot avatar moves as shown in FIG. 17A for example, the camera can be moved after a predetermined delay time lapses as shown in FIG. 17B. To put it in detail, in the case of an embodiment shown in FIGS. 17A and 17B, after the pilot avatar has been rotated (panned) in the counterclockwise direction by 90 degrees, the movement of the camera is started. As a result, the picture displayed by the browser changes from a screen on which the back of the pilot avatar 52 representing the user itself is seen as shown in FIG. 9 for example to a screen with the left side view of the face of the pilot avatar 52 gradually becoming visible due to the rotation of the pilot avatar 52. As the rotation is completed, the left side of the pilot avatar 52 is completely visible as shown in FIG. 18. Thereafter, the movement (strictly speaking, the rotation in this case) of the camera is started and the picture displayed by the browser gradually changes to screen showing the pilot avatar 52 seen from a position behind the pilot avatar 52.

In this case, the sense felt as if the soul were following the pilot avatar with a swaying feeling can be obtained.

It should be noted that FIGS. 16 and 17 are diagrams each showing the pilot avatar and the camera seen by the viewer facing toward the −y direction as is the case with FIGS. 19 and 20 to be described later.

In the example described above, the movement of the camera is started after a predetermined delay time has lapsed since the start of the behavior of the pilot avatar. As an alternative, the movement of the camera can also be started for example when the pilot avatar is about to go beyond the photographing range of the camera.

Figure 19A:
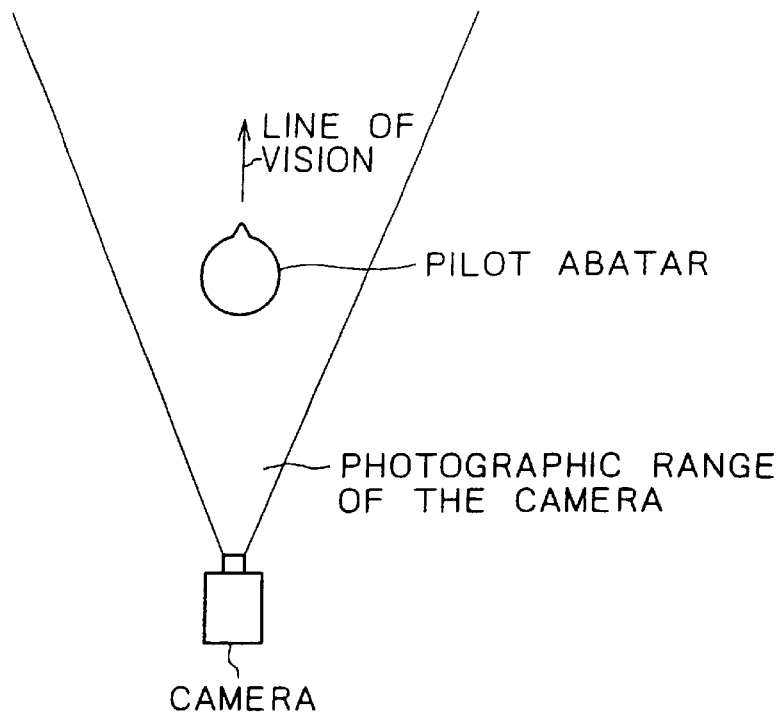
FIGS. 19A and 19B are still another diagrams each showing a relation between a behavior of a pilot avatar and a movement of the camera.
Figure 19B:
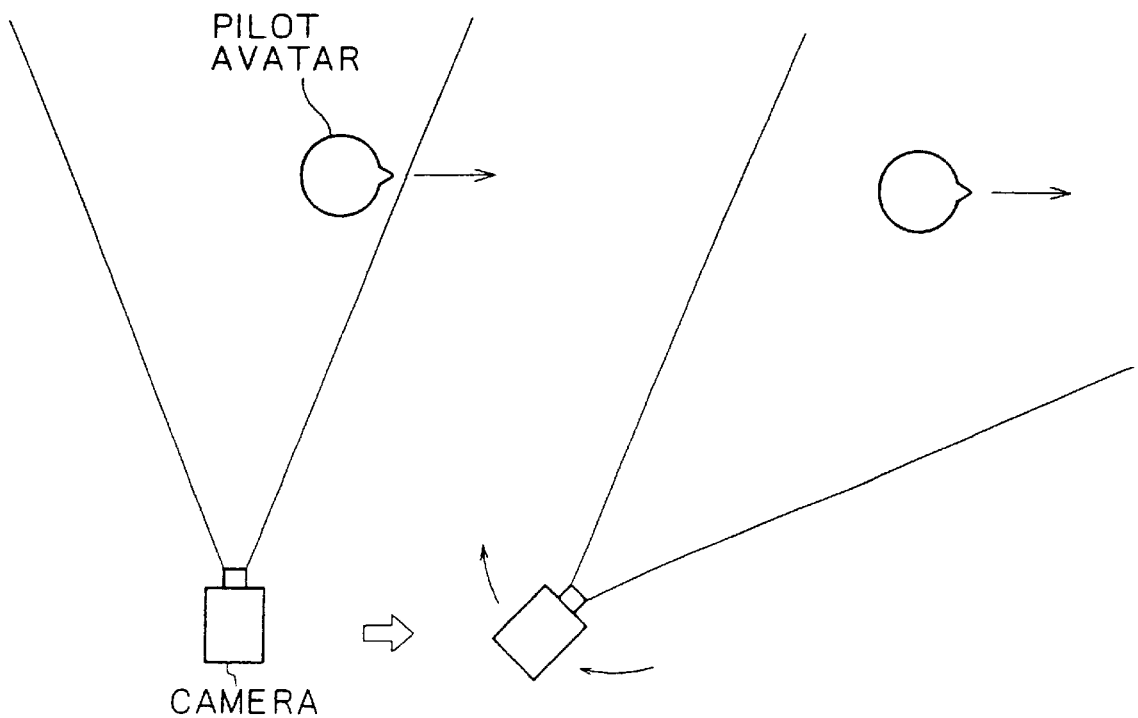

As shown in FIG. 19A, the camera is not moved as long as the pilot avatar is present in the photographing range of the camera. It should be noted, however, that also in this example, the camera can be moved so as to maintain the distance between the camera and the pilot avatar at β explained earlier by referring to FIGS. 12 and 13. Then, the movement of the camera is started when the pilot avatar is about to go beyond the photographing range of the camera in order to keep the pilot avatar within the photographing range of the camera as shown in FIG. 19B.

Also in this example, the sense felt as if the soul were following the pilot avatar with a swaying feeling can be obtained.

In the above example, the photographing range of the camera is determined with the camera used as a base and the movement of the camera is started when the pilot avatar is about to go beyond the photographing range. As another alternative, the photographing range of the camera is determined with the pilot avatar used as a base and the movement of the camera is started when the camera is about to go beyond the photographing range as a result of a movement of the pilot avatar.

Figure 20A:
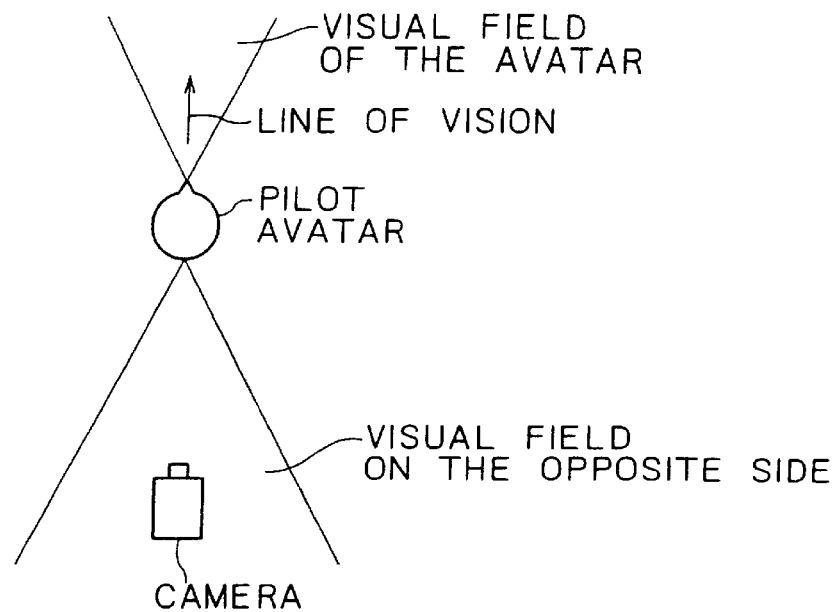
FIGS. 20A and 20B are further diagrams each showing a relation between a behavior of a pilot avatar and a movement of the camera.
Figure 20B:
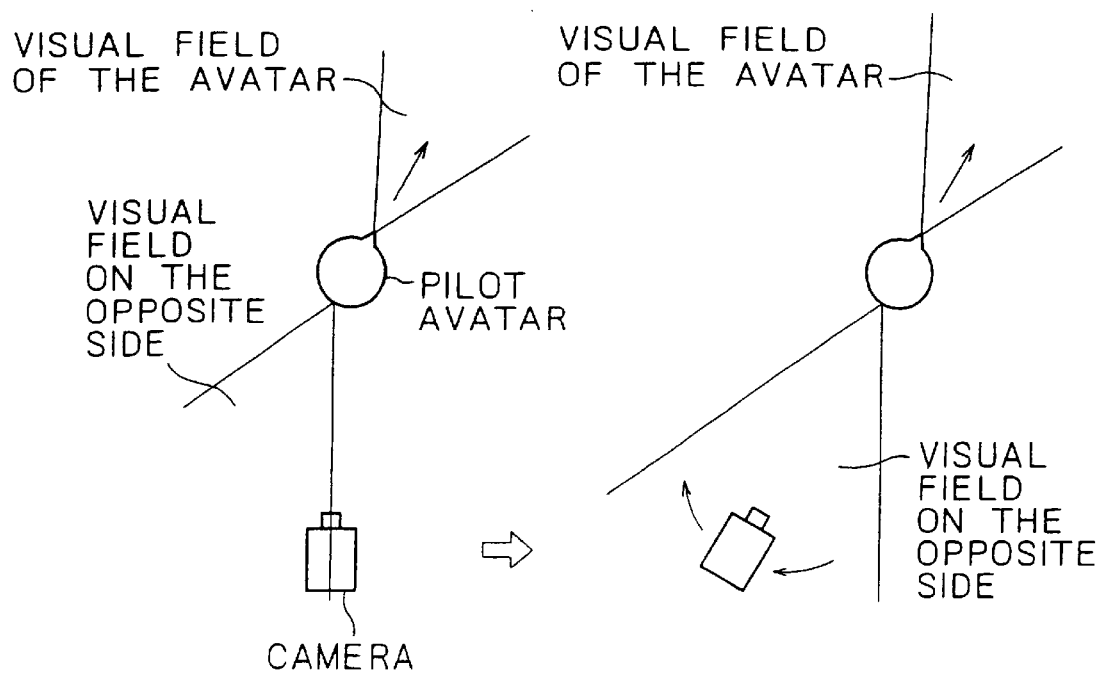

In the following example, a photographing range coinciding with the visual field of the pilot avatar is assumed behind the pilot avatar as shown in FIG. 20A. A photographing range coinciding with the visual field of the pilot avatar assumed behind the pilot avatar is appropriately referred to hereafter as a field of vision on the opposite side of the pilot avatar. Then, the movement of the camera is started when the camera is about to go beyond the photographing range assumed behind the avatar as a result of a movement of the pilot avatar as shown in FIG. 20B.

Also in this example, the sense felt as if the soul were following the pilot avatar with a swaying feeling can be obtained.

Since the first-person mode making the visual point of the pilot avatar coincident with the position of the camera and the third-person mode making the visual point of the pilot avatar not coincident with the position of the camera are available as described above, by switching from one mode to another, the user is capable of feeling a sense as if the user itself were present in a virtual world and feeling a sense as if the user had departed from the body of the user as a soul.

In addition, in the third-person mode, the position of the camera for photographing a picture to be presented to the user is controlled on the basis of the visual point (Eyepoint) of the avatar. Thus, the visual point of the user can be dynamically changed to a proper position that allows the user to feel a sense as if the user itself had departed from the body of the user as a soul, following the pilot avatar.

It should be noted that a program to be executed for carrying out various kinds of processing described above can be recorded on a floppy disc, a CD-ROM disc and other recording media to be presented to the user or presented to the user by transmission through the Internet or another network.

In addition, the computation of the standard position of the camera and other processing can be carried out typically by the browser or the VRML contents.

Furthermore, a picture obtained in the third-person mode can be presented without embracing the concepts of the visual point of the avatar (Eyepoint) and the position of the camera (Renderingpoint). In a multi-user environment, however, the concepts of the visual point of the avatar and the position of the camera are introduced and, unless they are separated from each other, it will be difficult to display the pilot avatar appearing in the 3-dimensional virtual space on the client PC of another user.

By virtue of the display control apparatus according to the first aspect of the present invention, the display control method according to the second aspect of the present invention and the presentation medium according to the third aspect of the present invention, in an operation to present a picture of a 3-dimensional virtual space photographed by using a hypothetical photographing means used for photographing a 3-dimensional virtual space, it is possible to switch from a first-person mode in which a visual point of a self representing object representing the user itself in a 3-dimensional virtual space coincides with the position of the photographing means to a third-person mode with the visual point of the self representing object not coinciding with the position of the photographing means and vice versa, and in the third-person mode, the position of the photographing means is controlled in accordance with the visual point of the self representing object. As a result, the visual point of the user can be changed dynamically to a proper position in accordance with the visual point of the self representing object, making the user capable of feeling a variety of senses.

What is claimed is:

1. A display control apparatus for controlling an operation to display a 3-dimensional virtual space, comprising:

presentation means for presenting a picture of a 3-dimensional virtual space photographed by using a hypothetical photographing means used for photographing a 3-dimensional virtual space;

mode switching means for switching from a first-person mode in which a visual point of view of the self representing object representing the user in a 3-dimensional virtual space coincides with the position of said A photographing means to a third-person mode with said visual point of view of said self representing object not coinciding with said position of said photographing means and vice-versa; and control means or controlling said position of said photographing means in accordance with said visual point of view of said self representing object in said third person mode, wherein said control means controls said photographing means in said third person mode with said visual point of view of said self representing object not coinciding with said position of said photographing means in an auto mode such that said photographing means automatically changes values of a position and orientation to follow said self-representing object when said self representing object moves dynamically in said 3-dimensional virtual space.

2. A display control apparatus according to claim 1 wherein, in said third-person mode, said control means moves said photographing means to a point which is located:

on a straight line passing through s aid visual point of said self representing object and forming a predetermined angle of elevation with a line of vision of said self representing object; and behind said self representing object at a predetermined distance from said visual point of said self representing object.

3. A display control apparatus according to claim 2 wherein said predetermined distance has such a value that a width of a picture obtained as a result of photographing by using said photographing means is a predetermined number of times the width of said self representing object.

4. A display control apparatus according to claim 1 wherein, in said third-person mode, when said visual point of said self representing object is changed to a new visual point, said control means moves said photographing means on the basis of said new visual point.

5. A display control apparatus according to claim 4 wherein, when said visual point of said object is changed, said control means starts moving said photographing means after a predetermined delay time has lapsed.

6. A display control apparatus according to claim 4 wherein said control means starts moving said photographing means when said self representing object is about to go beyond a range determined with said photographing means taken as a reference.

7. A display control apparatus according to claim 4 wherein said control means starts moving said photographing means when said photographing means is about to go beyond a range determined with said self representing object taken as a reference as a result of a movement of said self representing object.

8. A display control apparatus according to claim 4 wherein said control means moves said photographing means to a position found by interpolation between a position said photographing means is supposed to be moved to and a present position of said photographing means before said self representing object moves when said self representing object moves in said third-person mode to a new position at which switching from said first-person mode to said third-person mode occurs.

9. A display control method for controlling an operation to display a 3-dimensional virtual space whereby:

in an operation to present a picture of a 3-dimensional virtual space photographed by using a hypothetical photographing means used for photographing a 3-dimensional virtual space, it is possible to switch from a first-person mode in which a visual point of a self representing object representing the user in a 3-dimensional virtual space coincides with a position of said photographing means to a third-person mode with said visual point of said self representing object not coinciding with said position of said photographing means and vice versa; and in said third-person mode, said position of said photographing means is controlled in accordance with said visual point of view one self representing object, wherein said photographing means in said third person mode with said visual point of view of said self representing object not coinciding with said position of said photographing means is configured for use in an auto mode such that said photographing means automatically changes values of a position and orientation to follow said self-representing object when said self representing object moves dynamically in said 3-dimensional virtual space.

10. A display control method according to claim 9 whereby, in said third-person mode, when said visual point of said self representing object is changed to a new visual point, an operation to move said photographing means is controlled on the basis of said new visual point.

11. A presentation medium for presenting a computer program to be executed by a computer in order to carry out processing of controlling an operation to display a 3-dimensional virtual space, said computer program prescribing a display control method whereby:

in an operation to present a picture of a 3-dimensional virtual space photographed by using a hypothetical photographing means used for photographing a 3-dimensional virtual space, it is possible to switch from a first-person mode in which a visual point of a self representing object representing the user in a 3-dimensional virtual space coincides with a position of said photographing means to a third-person mode with said visual point of said self representing object not coinciding with said position of said photographing means and vice versa; and in said third-person mode, said position of said photographing means is controlled in accordance with said visual point of said self representing object, wherein said photographing means in said third person mode with said visual point of view of said self representing object not coinciding with said position of said photographing means is configured for use in an auto mode such that said photographing means automatically changes values of a position and orientation to follow said self-representing object when said self representing object moves dynamically in said 3-dimensional virtual space.

12. A presentation medium according to claim 11 wherein, in said third-person mode, when said visual point of said self representing object is changed to a new visual point, an operation to move said photographing means is controlled on the basis of said new visual point.

* * * * *

UNITED STATES PATENT AND TRADEMARK OFFICE
CERTIFICATE OF CORRECTION

PATENT NO. : 6,331,853 B1
DATED : December 18, 2001
INVENTOR(S) : Ken Miyashita

It is certified that error appears in the above-identified patent and that said Letters Patent is hereby corrected as shown below:

Column 7,
Line 55, please insert -- "MF". -- after the word "characters".

Column 12,
Line 48, please start new paragraph -- For setting, --.

Column 15,
Line 37, please start new paragraph -- In sample 14, --.

Column 17,
Line 17, please change "Changed" to -- changed --.

Column 18,
Line 62, please change "a n" to -- an --.

Column 25,
Line 50, please change "no de" to -- node --.

Column 26,
Line 22, please change "viewpoint" to -- Viewpoint --.

Column 32,
Line 54, please change "t he" to -- the --.

Column 33,
Line 10, please change "not ed" to -- noted --.

Signed and Sealed this

Twentieth Day of August, 2002

*Attest:*

JAMES E. ROGAN
*Director of the United States Patent and Trademark Office*

*Attesting Officer*